US012613898B2

(12) United States Patent
Padaliak et al.

(10) Patent No.: US 12,613,898 B2
(45) Date of Patent: Apr. 28, 2026

(54) SYSTEMS AND METHODS FOR DATA-DRIVEN QUERY AND RESPONSE GENERATION

(71) Applicant: Wolters Kluwer DXG U.S., Inc., Riverwoods, IL (US)

(72) Inventors: Yauheni Padaliak, Hawthorn Woods, IL (US); William Stephen Flannery, Plainsboro, NJ (US); Ronald Burton Edgecomb, II, Toms River, NJ (US); Mikalai Krapivin, West Windsor, NJ (US); Brynn James McCormick, Toms River, NJ (US); Aliaksandr Autayeu, Amsterdam (NL)

(73) Assignee: Wolters Kluwer DXG U.S., Inc., Riverwoods, IL (US)

( * ) Notice: Subject to any disclaimer, the term of this patent is extended or adjusted under 35 U.S.C. 154(b) by 0 days.

(21) Appl. No.: 18/971,928

(22) Filed: Dec. 6, 2024

(65) Prior Publication Data

US 2025/0200093 A1     Jun. 19, 2025

Related U.S. Application Data

(60) Provisional application No. 63/607,895, filed on Dec. 8, 2023, provisional application No. 63/607,891, filed on Dec. 8, 2023.

(51) Int. Cl.
   *G06F 16/335*     (2019.01)
   *G06F 16/332*     (2019.01)
   (Continued)

(52) U.S. Cl.
   CPC ........ *G06F 16/335* (2019.01); *G06F 16/3322* (2019.01); *G06F 16/35* (2019.01); *G06F 40/109* (2020.01)

(58) Field of Classification Search
   CPC .... G06F 16/335; G06F 16/3322; G06F 16/35; G06F 40/109; G06F 16/3326
   (Continued)

(56) References Cited

U.S. PATENT DOCUMENTS

| | | | |
|---|---|---|---|
| 6,732,088 B1 * | 5/2004 | Glance ................ | G06F 16/9538 707/999.005 |
| 8,676,827 B2 * | 3/2014 | Metzler .............. | G06Q 30/0256 707/765 |

(Continued)

OTHER PUBLICATIONS

International Search Report issued in corresponding Application No. PCT/US2024/058899, dated May 9, 2025, 3 pages.

*Primary Examiner* — Md I Uddin
(74) *Attorney, Agent, or Firm* — Morgan, Lewis & Bockius LLP

(57) ABSTRACT

A system and method are provided for automatic query and response generation. A first query is obtained, a plurality documents that are relevant to the first query is identified, and the plurality of documents is presented via an interface. In response to receiving a selection of one or more documents from the plurality of documents, and for each document of the one or more documents, a set of textual content elements is generated and feedback data is received indicating a selection of one or more of the set of textual content elements. The one or more of the set of textual content elements is associated with a set of queries including the first query. In response to receiving a second query in the set of queries, a preferred response associated with the set of queries is selected and displayed.

11 Claims, 22 Drawing Sheets

(51) Int. Cl.
    *G06F 16/35*        (2019.01)
    *G06F 40/109*     (2020.01)

(58) Field of Classification Search
    USPC ....... 707/706, 708, 711, 713, 723, 754, 765,
                                   707/17.009, 17.108
    See application file for complete search history.

(56)                      References Cited

U.S. PATENT DOCUMENTS

| | | | |
|---|---|---|---|
| 9,916,366 B1 * | 3/2018 | Shukla | .................. G06F 16/248 |
| 2022/0197951 A1 * | 6/2022 | Stober | .................. G06F 16/904 |
| 2023/0129094 A1 | 4/2023 | Lauritzen et al. | |

* cited by examiner

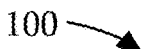
100

```
┌─────────────────────────────────────────────┐
│      Generate Set of Domain-Specific Queries  │
│                    102                        │
└─────────────────────────────────────────────┘
                        │
                        ▼
┌─────────────────────────────────────────────┐
│      Cluster Semantically Similar Queries     │
│                    104                        │
└─────────────────────────────────────────────┘
                        │
                        ▼
┌─────────────────────────────────────────────┐
│     Generate Responses for One or More Queries│
│                    106                        │
└─────────────────────────────────────────────┘
                        │
                        ▼
┌─────────────────────────────────────────────┐
│    Receive Feedback for Query/Response Pairs  │
│                    108                        │
└─────────────────────────────────────────────┘
                        │
                        ▼
┌─────────────────────────────────────────────┐
│    Store Set of Curated Query/Response Pairs  │
│                    110                        │
└─────────────────────────────────────────────┘
```

Figure 9H:
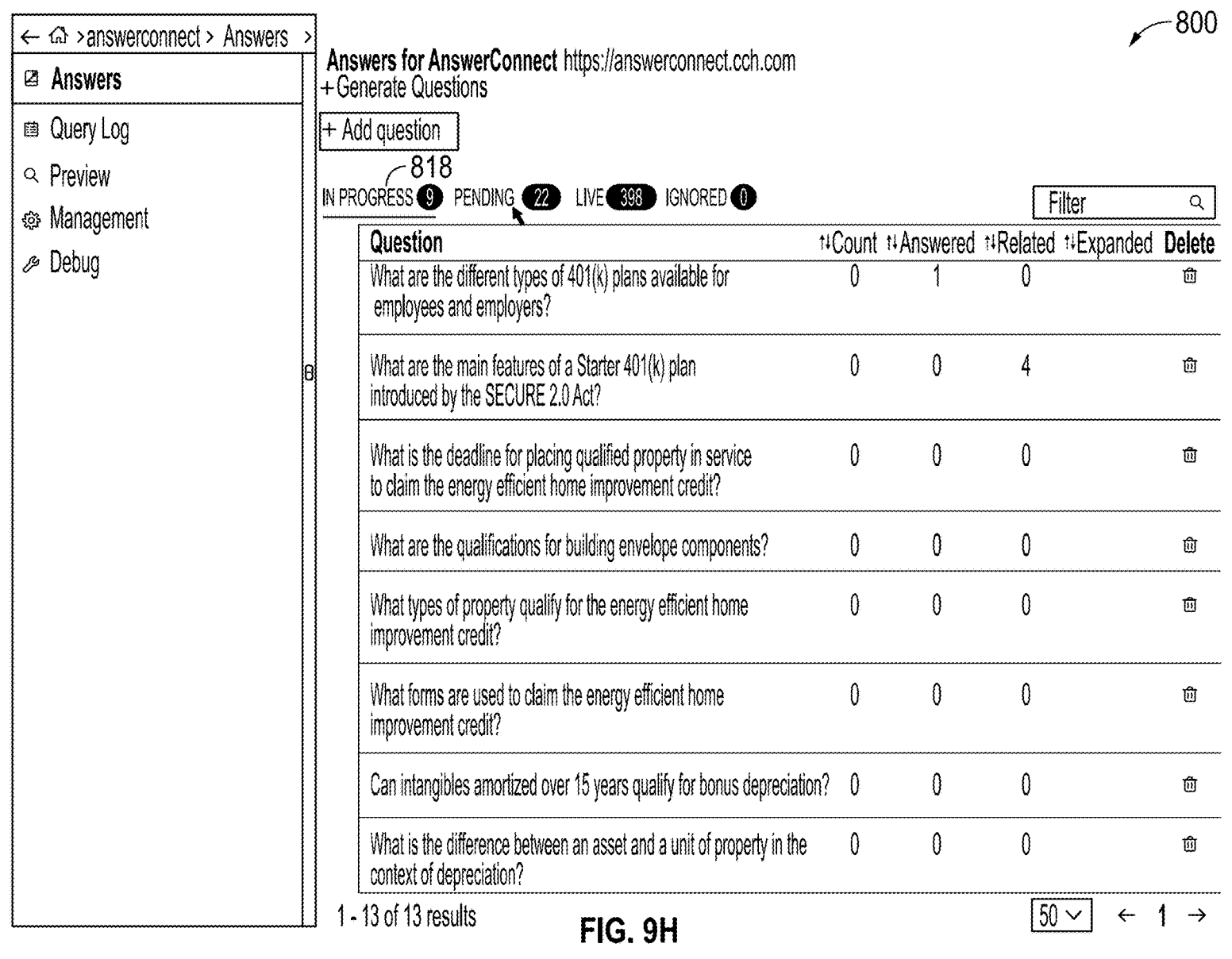

← ⌂ > answerconnect > Answers ∨

Answers

🗒 Query Log
🔍 Preview
⚙ Management
✏ Debug

Answers for AnswerConnect https://answerconnect.cch.com
+Generate Questions

[+ Add question]

⌐818

IN PROGRESS ❾ PENDING ㉒ LIVE ③⑨③ IGNORED ⓪

| Question | ‡Count | ‡Answered | ‡Related | ‡Expanded | Delete |
|---|---|---|---|---|---|
| What are the different types of 401(k) plans available for employees and employers? | 0 | 0 | 0 | | 🗑 |
| What are the main features of a Starter 401(k) plan introduced by the SECURE 2.0 Act? | 0 | 0 | 1 | 4 | 🗑 |
| What is the deadline for placing qualified property in service to claim the energy efficient home improvement credit? | 0 | 0 | 0 | | 🗑 |
| What are the qualifications for building envelope components? | 0 | 0 | 0 | | 🗑 |
| What types of property qualify for the energy efficient home improvement credit? | 0 | 0 | 0 | | 🗑 |
| What forms are used to claim the energy efficient home improvement credit? | 0 | 0 | 0 | | 🗑 |
| Can intangibles amortized over 15 years qualify for bonus depreciation? | 0 | 0 | 0 | | 🗑 |
| What is the difference between an asset and a unit of property in the context of depreciation? | 0 | 0 | 0 | | 🗑 |

[Filter 🔍]

1 - 13 of 13 results

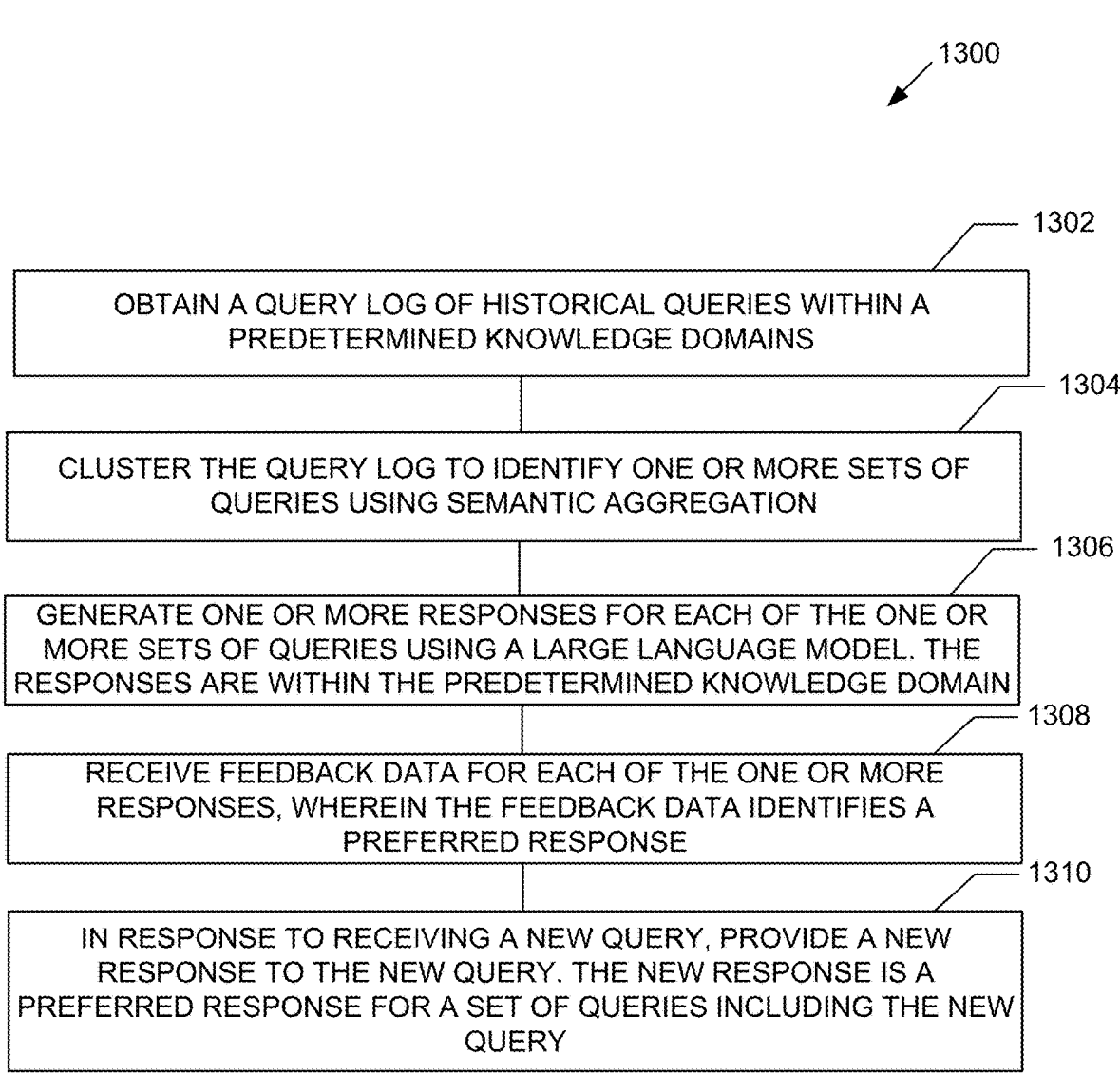

1300

1302

OBTAIN A QUERY LOG OF HISTORICAL QUERIES WITHIN A
PREDETERMINED KNOWLEDGE DOMAINS

1304

CLUSTER THE QUERY LOG TO IDENTIFY ONE OR MORE SETS OF
QUERIES USING SEMANTIC AGGREGATION

1306

GENERATE ONE OR MORE RESPONSES FOR EACH OF THE ONE OR
MORE SETS OF QUERIES USING A LARGE LANGUAGE MODEL. THE
RESPONSES ARE WITHIN THE PREDETERMINED KNOWLEDGE DOMAIN

1308

RECEIVE FEEDBACK DATA FOR EACH OF THE ONE OR MORE
RESPONSES, WHEREIN THE FEEDBACK DATA IDENTIFIES A
PREFERRED RESPONSE

1310

IN RESPONSE TO RECEIVING A NEW QUERY, PROVIDE A NEW
RESPONSE TO THE NEW QUERY. THE NEW RESPONSE IS A
PREFERRED RESPONSE FOR A SET OF QUERIES INCLUDING THE NEW
QUERY

FIG. 12

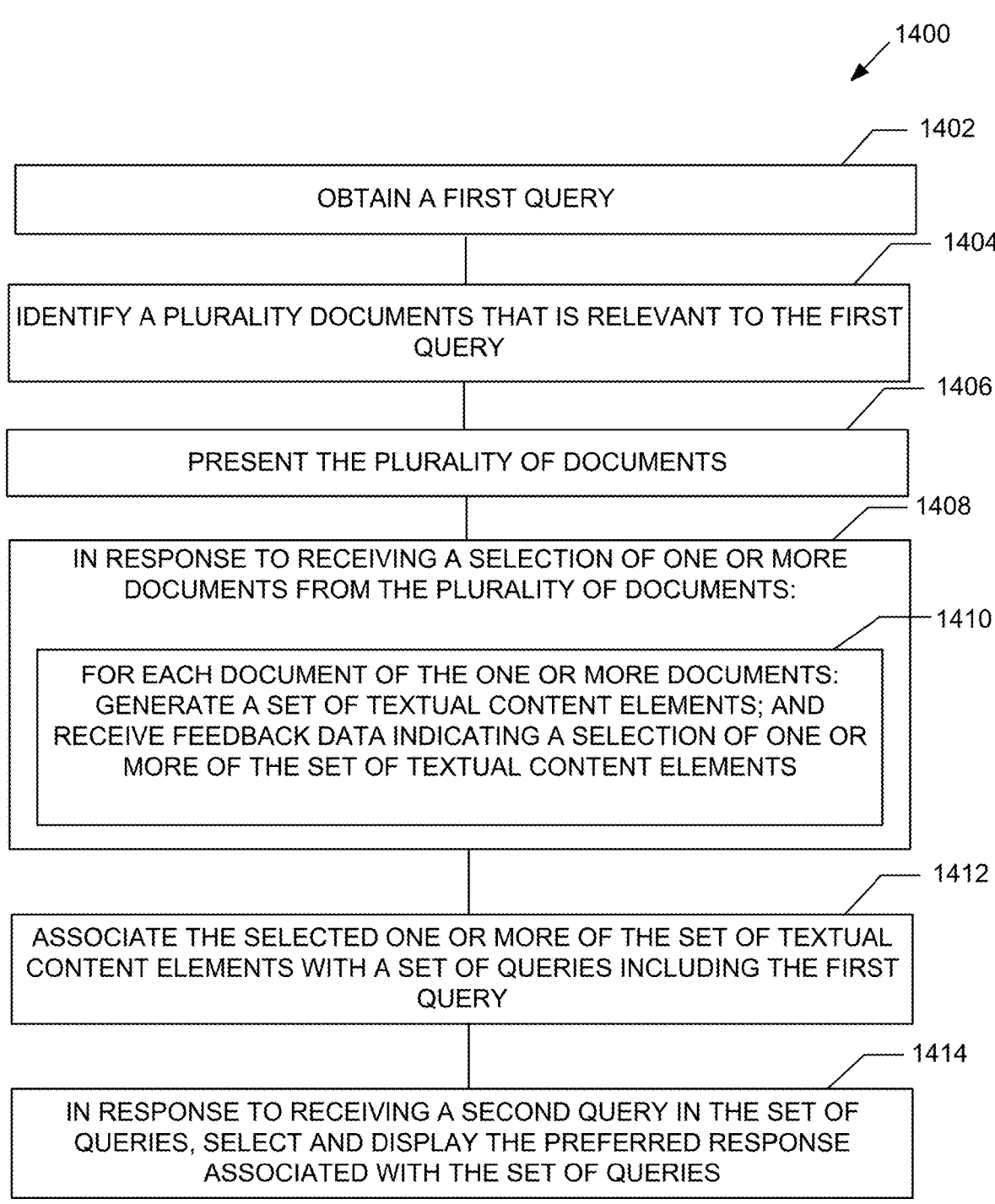

1400

1402
OBTAIN A FIRST QUERY

1404
IDENTIFY A PLURALITY DOCUMENTS THAT IS RELEVANT TO THE FIRST QUERY

1406
PRESENT THE PLURALITY OF DOCUMENTS

1408
IN RESPONSE TO RECEIVING A SELECTION OF ONE OR MORE DOCUMENTS FROM THE PLURALITY OF DOCUMENTS:

1410
FOR EACH DOCUMENT OF THE ONE OR MORE DOCUMENTS: GENERATE A SET OF TEXTUAL CONTENT ELEMENTS; AND RECEIVE FEEDBACK DATA INDICATING A SELECTION OF ONE OR MORE OF THE SET OF TEXTUAL CONTENT ELEMENTS

1412
ASSOCIATE THE SELECTED ONE OR MORE OF THE SET OF TEXTUAL CONTENT ELEMENTS WITH A SET OF QUERIES INCLUDING THE FIRST QUERY

1414
IN RESPONSE TO RECEIVING A SECOND QUERY IN THE SET OF QUERIES, SELECT AND DISPLAY THE PREFERRED RESPONSE ASSOCIATED WITH THE SET OF QUERIES

FIG. 13

SYSTEMS AND METHODS FOR DATA-DRIVEN QUERY AND RESPONSE GENERATION

CROSS-REFERENCE TO RELATED APPLICATIONS

This application claims benefit under 35 U.S.C. § 119(e) to U.S. Provisional App. Ser. No. 63/607,895, filed Dec. 8, 2023, entitled "Systems and Methods for Data-Driven Query and Response Searching" and U.S. Provisional App. Ser. No. 63/607,891, filed Dec. 8, 2023, entitled "Systems and Methods for Data-Driven Query and Response Generation," the disclosure of each of which is incorporated by reference herein in its respective entirety.

TECHNICAL FIELD

This application relates generally to natural language processing, and more specifically to data-driven natural language processing using large language models.

BACKGROUND

Some current knowledge-based search systems provide sets of search results including documents related to a search query. Although such systems may provide large sets of responsive documents, such systems may not be trustworthy and/or reliable. In addition, these platforms are not capable of generating responses that correspond to a complexity of a request. For example, research complexity can vary. Simple research, which may be frequent, may take roughly 5 to 10 minutes to complete, and may be handled by staff and managers. This may include, for example, a fact and/or figure look-up via a search engine, or a research software tool. Such research may not require collaboration or interpretation. On the other hand, complex research, even if infrequent, may take 30 to 60 minutes to a half day or up to several days to complete. Such research may need to be handled by senior personnel with domain knowledge and expertise. In some instances, an organization may not have the right experts to response a specific query. For example, users may have queries regarding unique tax scenarios, such as nuanced industry and/or geography, pertaining to ambiguous areas of tax code. Although some current search platforms utilize complex technologies, such as generative artificial intelligence (AI), products, services and expert solutions need to be based on a foundation of trust and transparency.

SUMMARY

Accordingly, there is a need for systems, methods and interfaces that address at least some of the limitations described above. Described herein are implementations that use AI-based query and response generation. The techniques described herein may be integrated into a content generation and/or curation process. In some embodiments, instead of, or in addition to, using AI to generate responses to queries in real time, pre-curated responses may be searched and/or returned. Some embodiments provide a search box where a query is entered and the system returns one or more documents. The documents may be used as the context identifying queries and/or providing preferred, curated responses. Some embodiments analyze a search history to determine a trend in the queries, most popular queries, and/or popular query clusters. A goal of the system described herein may be to provide a reusable implementation for common query and/or response user interaction patterns, data sources, and/or supervision models. Data sources may include text content (e.g., books, journals, etc.), structured data sources (e.g., practice tools, drug databases, etc.), and/or customer data (e.g., accounting records, etc.). The system may be configured to integrated feedback data such as editorial review, approval of queries and/or responses, and/or community feedback (e.g., thumbs up/down). Some embodiments may include unsupervised learning (e.g., automatic, continuous and/or intermittent learning from user query logs).

Some embodiments provide a method for automatic query and response generation. The method may include obtaining a first query, identifying a plurality documents that is relevant to the first query, and presenting the plurality of documents. The method may also include, in response to receiving a selection of one or more documents from the plurality of documents: for each document of the one or more documents: generating a set of textual content elements and receiving feedback data indicating a selection of one or more of the set of textual content elements. The method may also include associating the selected one or more of the set of textual content elements with a set of queries including the first query, and in response to receiving a second query associated with the set of queries, selecting and displaying the preferred response associated with the set of queries.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and interfaces are disclosed that automatically and efficiently generate reliable queries and/or responses.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 3 is a flowchart illustrating a method of content generation and curation, in accordance with some embodiments;

FIG. 9B-9H illustrates different views of the query suggestion interface shown in FIG. 9A, in accordance with some embodiments;

FIG. 12 is a flowchart for an example method for automatic query and response generation, in accordance with some embodiments;

FIG. 13 is a flowchart of another example method for automatic query and response generation, in accordance with some embodiments.

DETAILED DESCRIPTION

Figure 1:
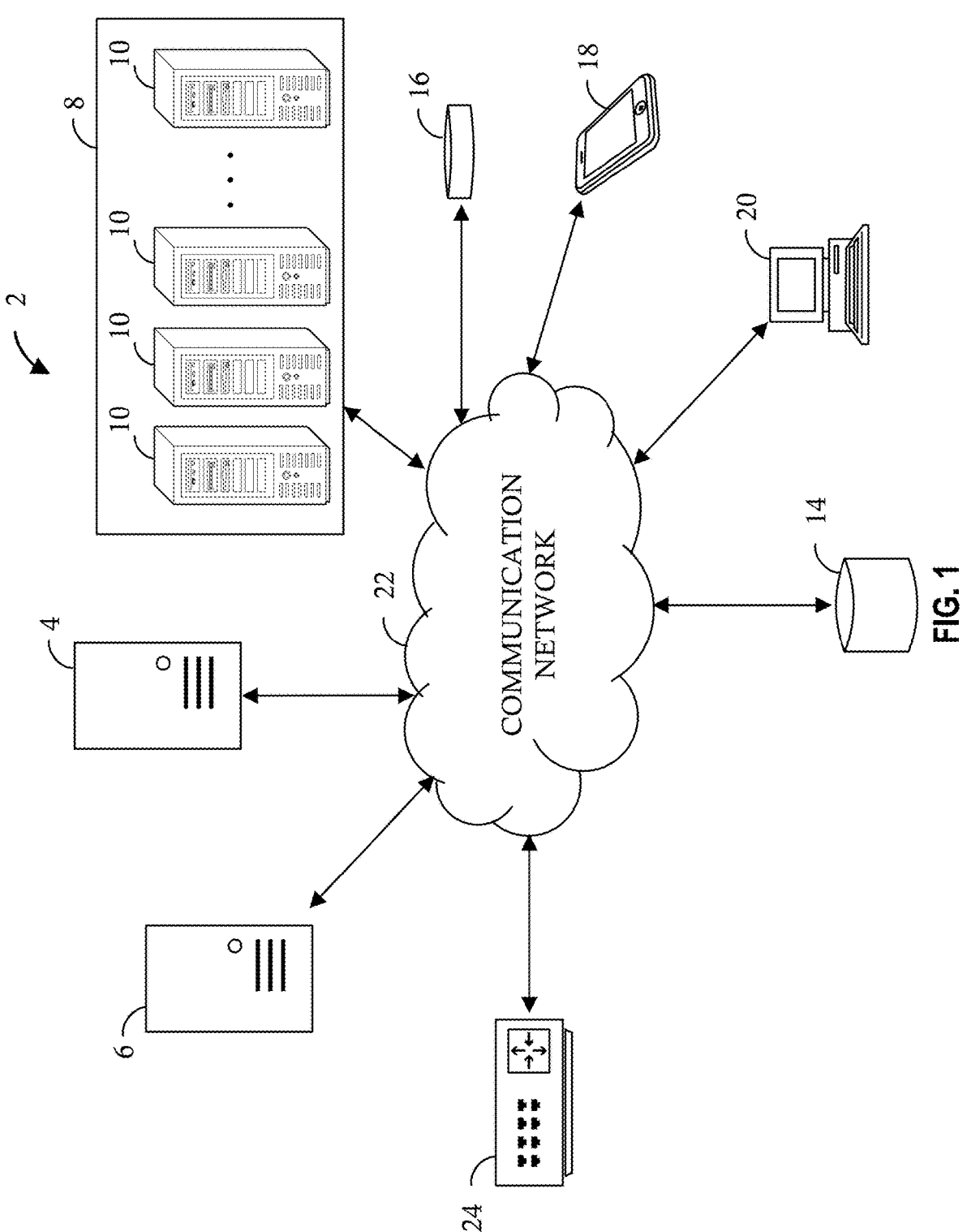
FIG. 1 illustrates a network environment configured to provide generation and curation of natural language, knowledge-based responses, in accordance with some embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only. The objectives and advantages of the claimed subject matter will become more apparent from the following detailed description of these exemplary embodiments in connection with the accompanying drawings.

Various embodiments are described herein with respect to systems and methods for facilitating knowledge-based search results. In some embodiments, generative AI models may be configured to generate textual content elements, such as, for example, queries and/or responses for one or more predetermined knowledge domains. Generative AI models may be used to create and/or curate queries and/or responses, for example, based on one or more documents within a predetermined knowledge domain. Feedback data, such as provided by reviewers, may be used to select or prioritize one or more queries and/or responses that are more likely to have a maximum impact for customers. In some embodiments, historical queries included in a query log and/or generated queries are clustered to identify common queries. The clustered queries may include, but are not limited to, historical user queries, queries created based on keywords, queries generated by one or more generative AI models, etc. In some embodiments, feedback data is used to determine common and/or trusted queries and/or responses within a knowledge domain.

In some embodiments, semantically similar queries are clustered based on semantic aggregation. Beyond basic aggregation that may be performed in an SQL server, to aggregate identical things, strings, or concepts, some embodiments perform semantic aggregations to create clusters of queries and/or prioritize the queries. Clustering is described below in reference to FIG. 15, in accordance with some embodiments.

In some embodiments, an editing interface (UI) may enable curation of queries, responses, and/or query-response pairs. The editing interface may show popular clusters, e.g., clusters having a set of queries that are searched for and/or interacted with most often by users. In some embodiments, the editing interface allows for creation of queries based on one or more key words and/or other inputs. Some embodiments provide AI-generated queries. Some embodiments use generative AI to obtain a query, run a search based on the query, and/or identify top documents (e.g., top ten documents). Out of these documents, some embodiments may iterate through each document, passing the document to a language model to suggest queries and/or responses, based on one or more keywords. Some embodiments provide a document plus key word and then the model may return with query and/or responses. Editors may review the results. After that, the reviewers may publish the results or make modifications and then publish the modified results.

In some embodiments, prompts for obtaining responses from a generative AI functionality may be submitted. Feedback may be received for one or more generated responses. If the feedback indicates a positive interaction (e.g., approval) for a generated response, the same response may be returned for a subsequent query that is semantically similar to the prior query.

FIG. 1 illustrates a network environment 2 configured to provide query/response generation and curation, in accordance with some embodiments. The network environment 2 includes a plurality of devices or systems configured to communicate over one or more network channels, illustrated as a network cloud 22. For example, in various embodiments, the network environment 2 may include, but is not limited to, a query/response generation computing device 4, a web server 6, a cloud-based engine 8 including one or more processing devices 10, a database 14, and/or one or more user computing devices 16, 18, 20 operatively coupled over the network 22. The query/response generation computing device 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the query/response generation computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the query/response generation computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the query/response generation computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

Although FIG. 1 illustrates three user computing devices 16, 18, 20, the network environment 2 may include any number of user computing devices 16, 18, 20. Similarly, the network environment 2 may include any number of query/response generation computing device 4, the web server 6, the processing devices 10, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the query/response generation computing device 4, the web server 6, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view data for elements associated with and displayed on the website, and click on interface elements presented via the website. The website may capture these activities as user session data, and transmit the user session data to the query/response generation computing device 4 over the communication network 22. The website may also allow the user to interact with one or more of interface elements to perform specific operations, such as selecting one or more elements for further processing.

In some embodiments, the query/response generation computing device 4 may execute one or more models, processes, or algorithms, such as a machine learning model, deep learning model, statistical model, etc., to generate and/or curate knowledge-based queries and/or responses. The query/response generation computing device 4 may transmit sets of generate queries and/or responses to the web server 6 over the communication network 22, and the web server 6 may display interface elements associated with obtaining feedback and/or curating queries and/or responses on the website to the user.

The query/response generation computing device 4 is further operable to communicate with the database 14 over the communication network 22. For example, the query/response generation computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the query/response generation computing device 4, in some embodiments, the database 14 may be a local storage device, such as a hard drive, a non-volatile memory, or a USB stick. The query/response generation computing device 4 may store interaction data received from the web server 6 in the database 14. The query/response generation computing device 4 may also receive from the web server 6 user session data identifying events associated with browsing sessions, and may store the user session data in the database 14.

In some embodiments, the query/response generation computing device 4 generates training data for a plurality of models (e.g., machine learning models, deep learning models, statistical models, algorithms, etc.) based on aggregation data, variant-level data, holiday and event data, recall data, historical user session data, search data, purchase data, catalog data, advertisement data for the users, etc. The query/response generation computing device 4 and/or one or more of the processing devices 10 may train one or more models based on corresponding training data. The query/response generation computing device 4 may store the models in a database, such as in the database 14 (e.g., a cloud storage database).

The models, when executed by the query/response generation computing device 4, allow the query/response generation computing device 4 to generate knowledge-based, text queries and/or responses. In some embodiments, the query/response generation computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, query/response generation computing device 4 may generate curated, clustered sets of queries having one or more preferred and/or curated responses associated therewith.

Figure 2:
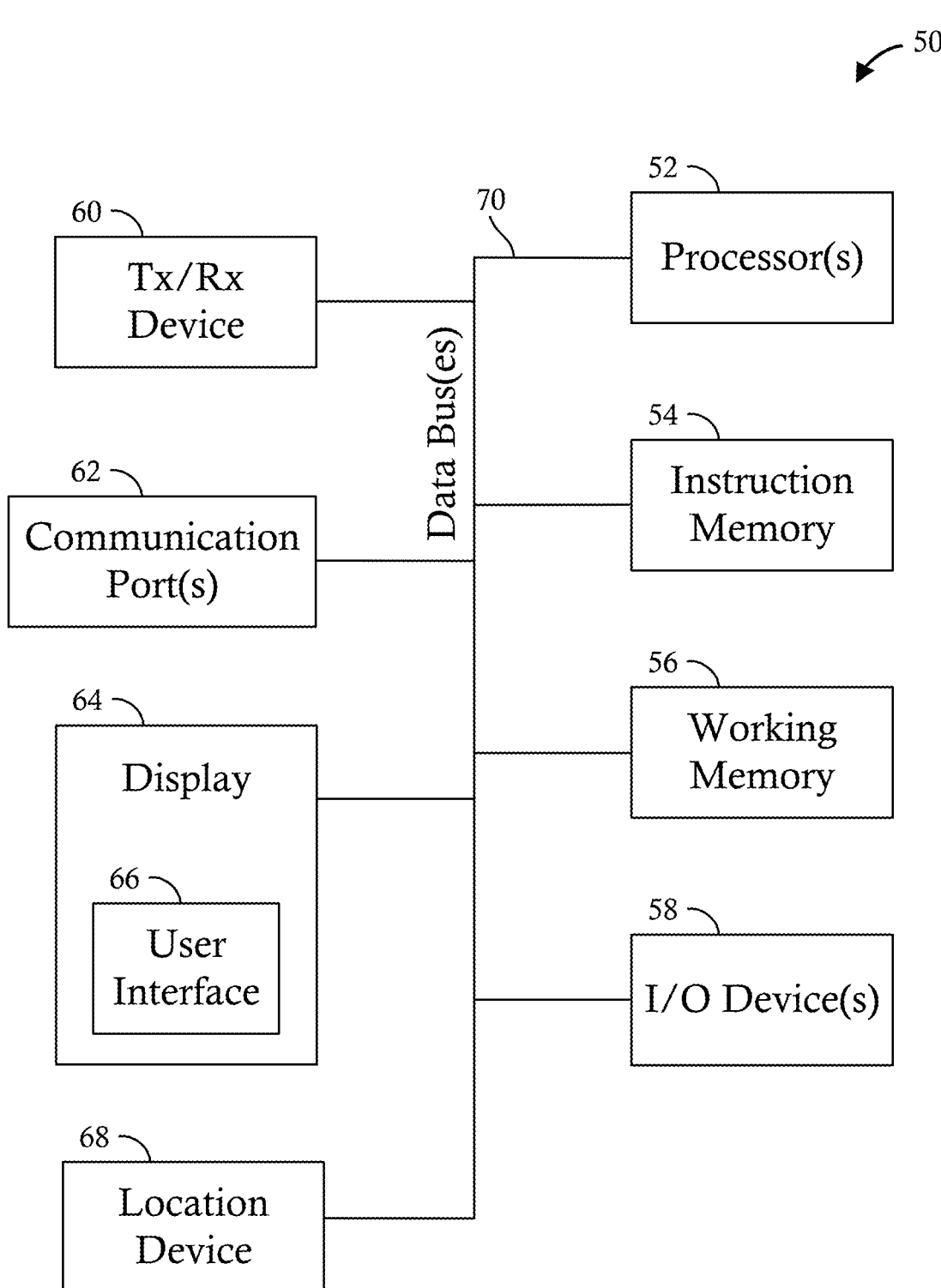
FIG. 2 illustrates a computer system configured to implement one or more processes, in accordance with some embodiments.

FIG. 2 illustrates a block diagram of a computing device 50, in accordance with some embodiments. In some embodiments, each of the query/response generation computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for generating knowledge-based queries and/or responses, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C #, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with [DESCRIPTION]. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

FIG. 3 is a flowchart illustrating content generation and curation method 100, in accordance with some embodiments. At step 102, a set of domain-specific queries is generated. The set of domain-specific queries may include one or more text based queries generated by one or more machine learning models, such as a large language model (LLM). In some embodiments, the queries are generated for a predetermined knowledge domain. Knowledge domains may include any suitable area of specialized knowledge having specific, determinable answers to specific questions. For example, knowledge domains may include, but are not limited to, a tax domain, a finance domain, a legal and/or regulatory domain, a health domain, a corporate governance domain, etc. In various embodiments, a knowledge domain may have a set of predetermined documents associated therewith.

Figure 4:
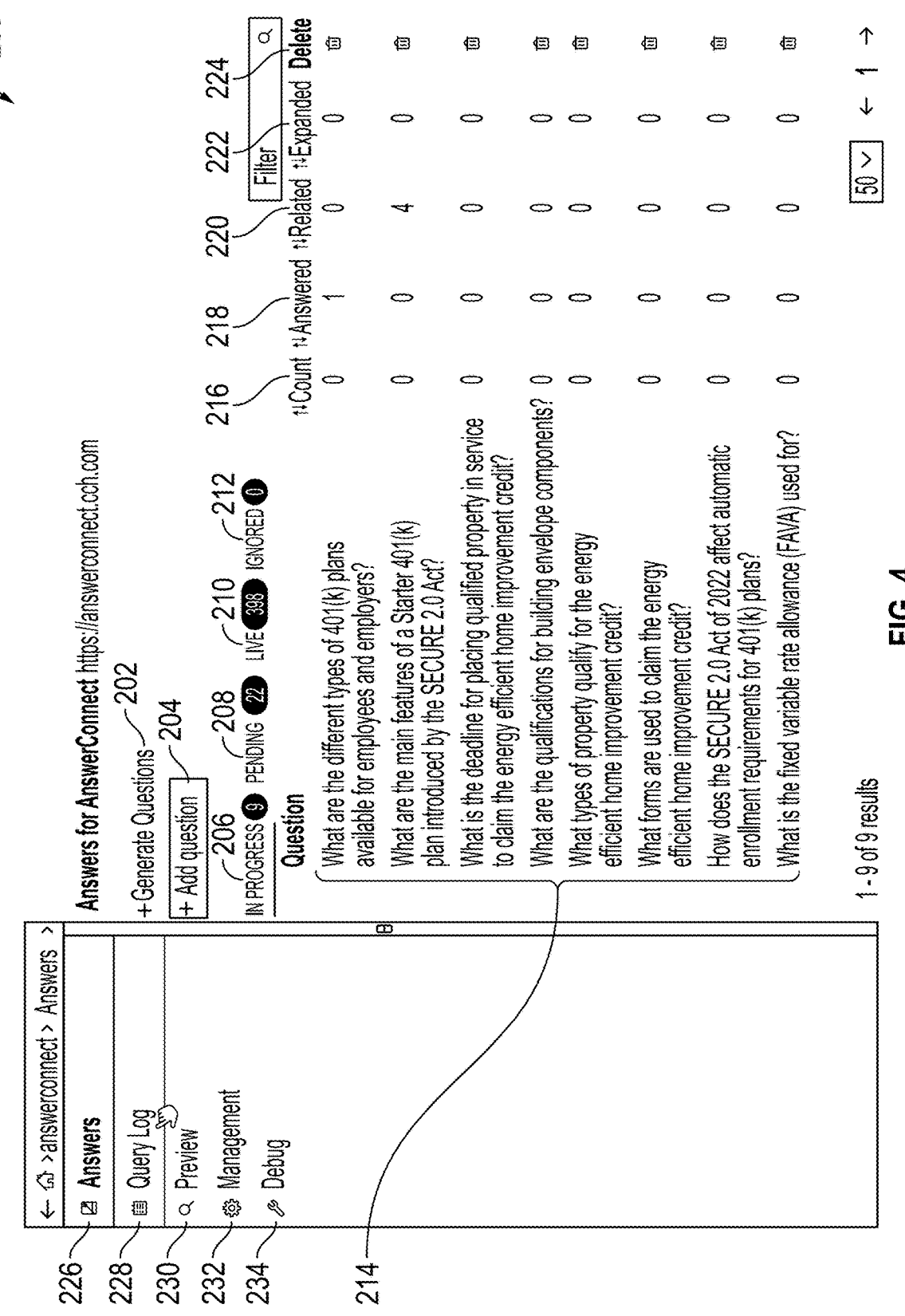
FIG. 4 illustrates a query-response association interface, in accordance with some embodiments.

FIG. 4 illustrates a query generation interface 200 for generating queries, in accordance with some embodiments. The interface 200 may provide affordances for generating queries 202, and/or adding queries 204. The interface 200 may show a list of queries 214. Further, the queries may be categorized (e.g., as in-progress 206 for queries currently being reviewed, pending 208 for queries already reviewed but waiting to be published, live 210 for queries that have been published, and ignored 212 for queries that have been ignored). Count 216 for a number of times a query may have been selected, responded 218 for a number of times a query may have been responded to, related 220 for related content, and/or expanded 222 for queries that may have been expanded, may also be indicated for each query. Any of the queries may be selected for deletion 224 (e.g., queries may be selected from the reviewing list). Options (or affordances, e.g., 226, 228, 230, 232, 234) may be shown for displaying responses, query log, preview, management, and/or debugging. Responses may be shown in response to selection of a responses option 226, and/or may be shown in a default landing page.

Figure 5:
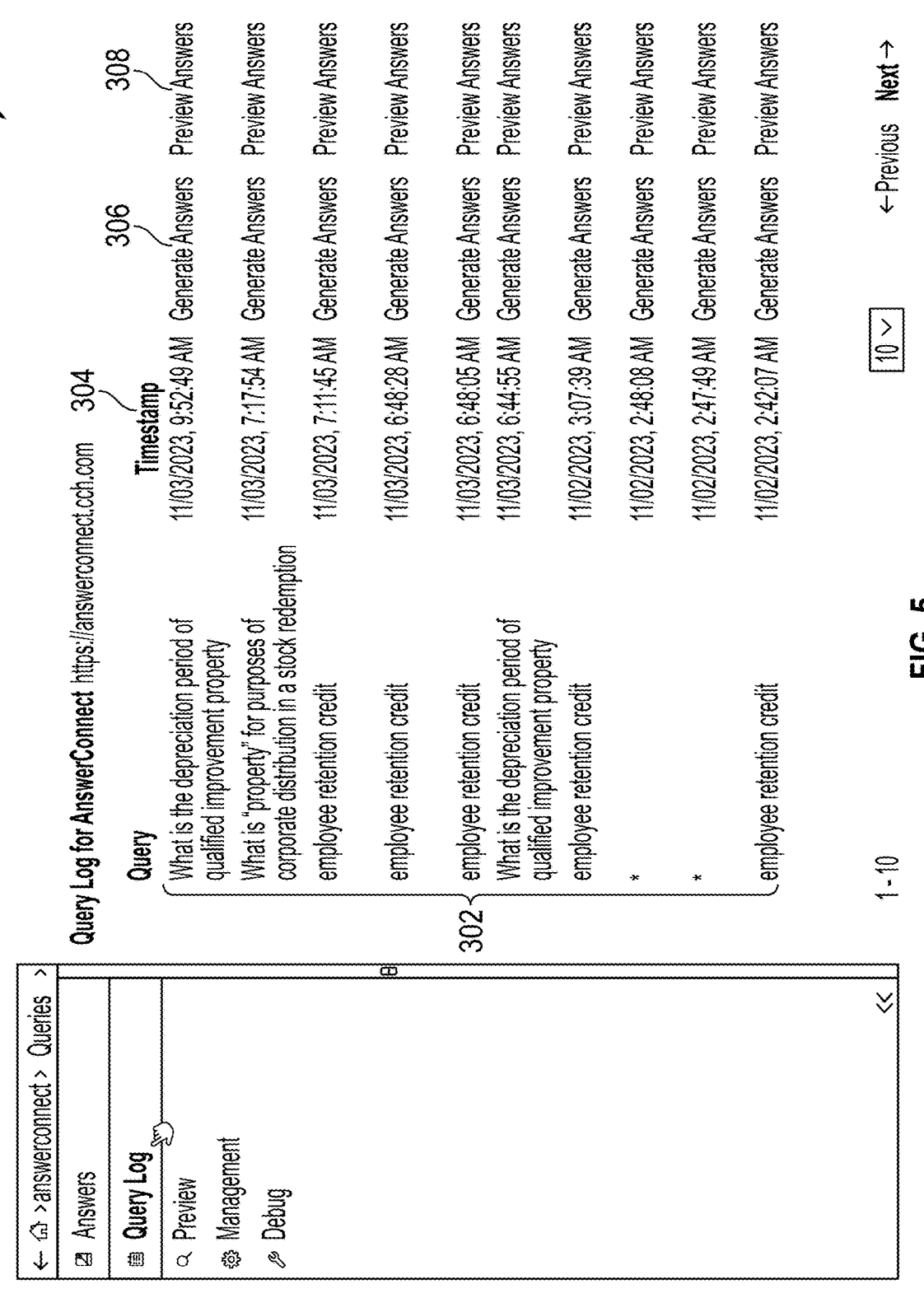
FIG. 5 illustrates a query log interface, in accordance with some embodiments.

FIG. 5 illustrates a query log interface 300, in accordance with some embodiments. The interface 300 may show a log of queries 302, timestamps 304 for each query, option 306 to generate responses for the queries, and/or options 308 to preview responses (previously generated) for each query. The query log may include queries from prior searches. The query log may include queries and/or responses.

In some embodiments, a set of is associated with at least one of a plurality of query clusters. Query clusters include clusters, or sets, of queries that are grouped (e.g., clustered) together. The query clusters may include semantically similar queries and/or topically similar queries identified by a semantic aggregation clustering process. As discussed in greater detail below, in some embodiments, the query clusters include clusters of historical and/or generated queries.

At step 104, one or more sets of similar queries may be identified by clustering each of the generated queries. Query clusters may include clusters, or sets, of queries that are grouped (e.g., clustered) together. The query clusters may include semantically similar queries and/or topically similar queries identified by a semantic aggregation clustering process. In some embodiments, the query clusters include clusters of generated queries. The queries may be clustered by one or more processes, such as one or more clustering processes discussed in greater detail below.

At step 106, a set of responses may be generated for one or more queries. For example, in some embodiments, a query generated by an LLM may be obtained and a search of documents within a knowledge-domain may be executed based on the query. A set of documents identified by the search, e.g., a top N documents may be provided to a generative AI model for generation of one or more responses. For example, in some embodiments, a generative AI model may receive each document, pass the document to a language model to suggest queries and/or responses, and revise the responses to generate natural language responses. The generated responses may include synthesized information obtained from one or more documents in the set of documents associated with the knowledge domain.

Figure 6:
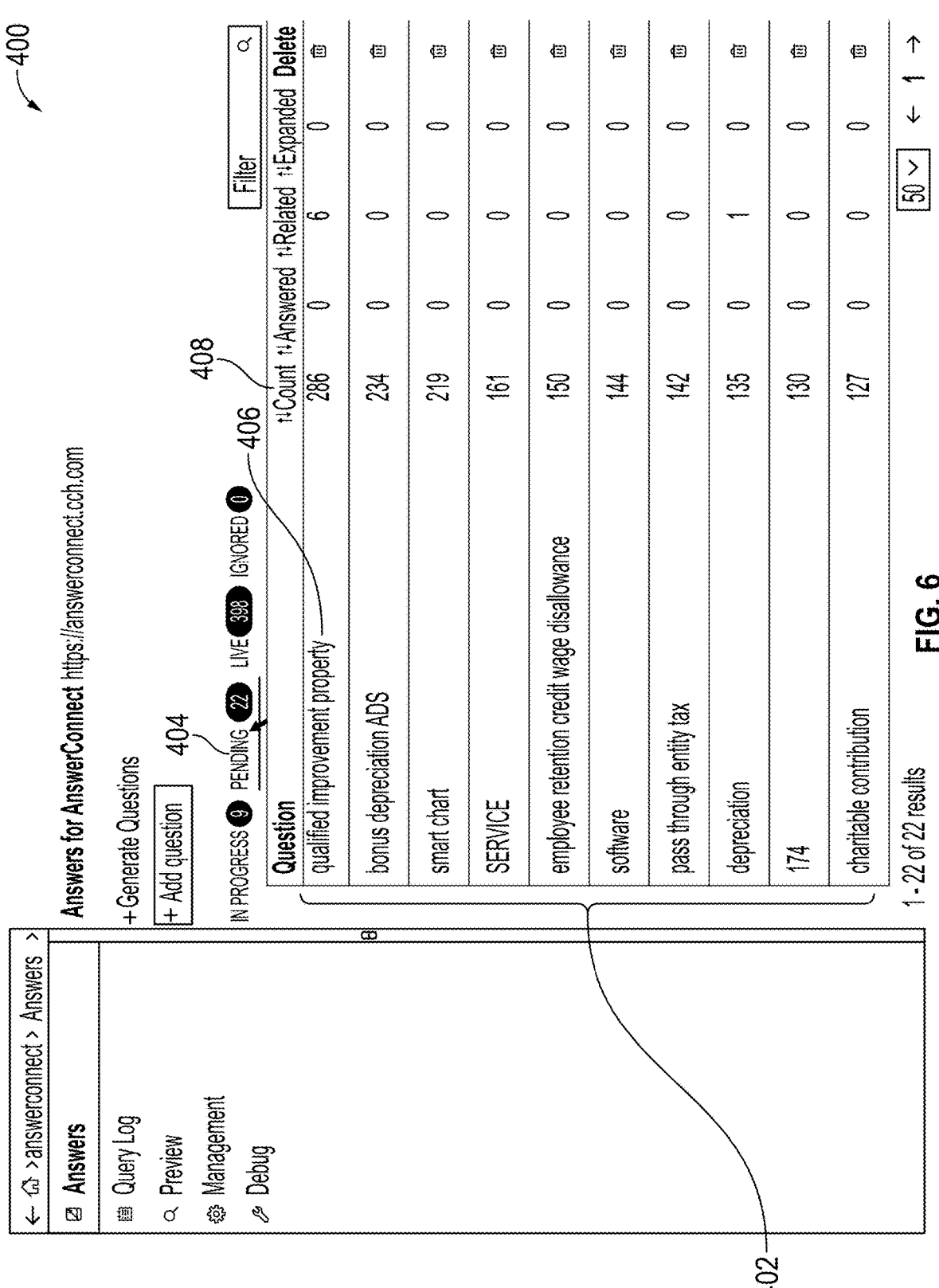
FIG. 6 illustrates a response feedback interface, in accordance with some embodiments.

At step 108, feedback data is received for one or more queries and/or corresponding responses in a set of clustered queries. FIG. 6 illustrates an interface 400 for providing feedback on queries and/or responses, in accordance with some embodiments. In some embodiments, sets of queries and/or responses may be clustered. When a response page is visited, a pending option (e.g., option 404, similar to option 208 described above in reference to FIG. 4) may be selected to view pending queries. Some embodiments show clusters 402 in response (e.g., as opposed to, or in addition to showing queries (e.g., the queries 214, FIG. 4). The example in FIG. 6 illustrates a cluster 406 for qualified improvement property. Some embodiments show a count 408 of the number of times that a query (and/or a cluster) was searched. This may include a count of searches times a number of months a query cluster was searched. The counts and/or statistics may be aggregated by the system for different queries in a query cluster.

Figure 7A:
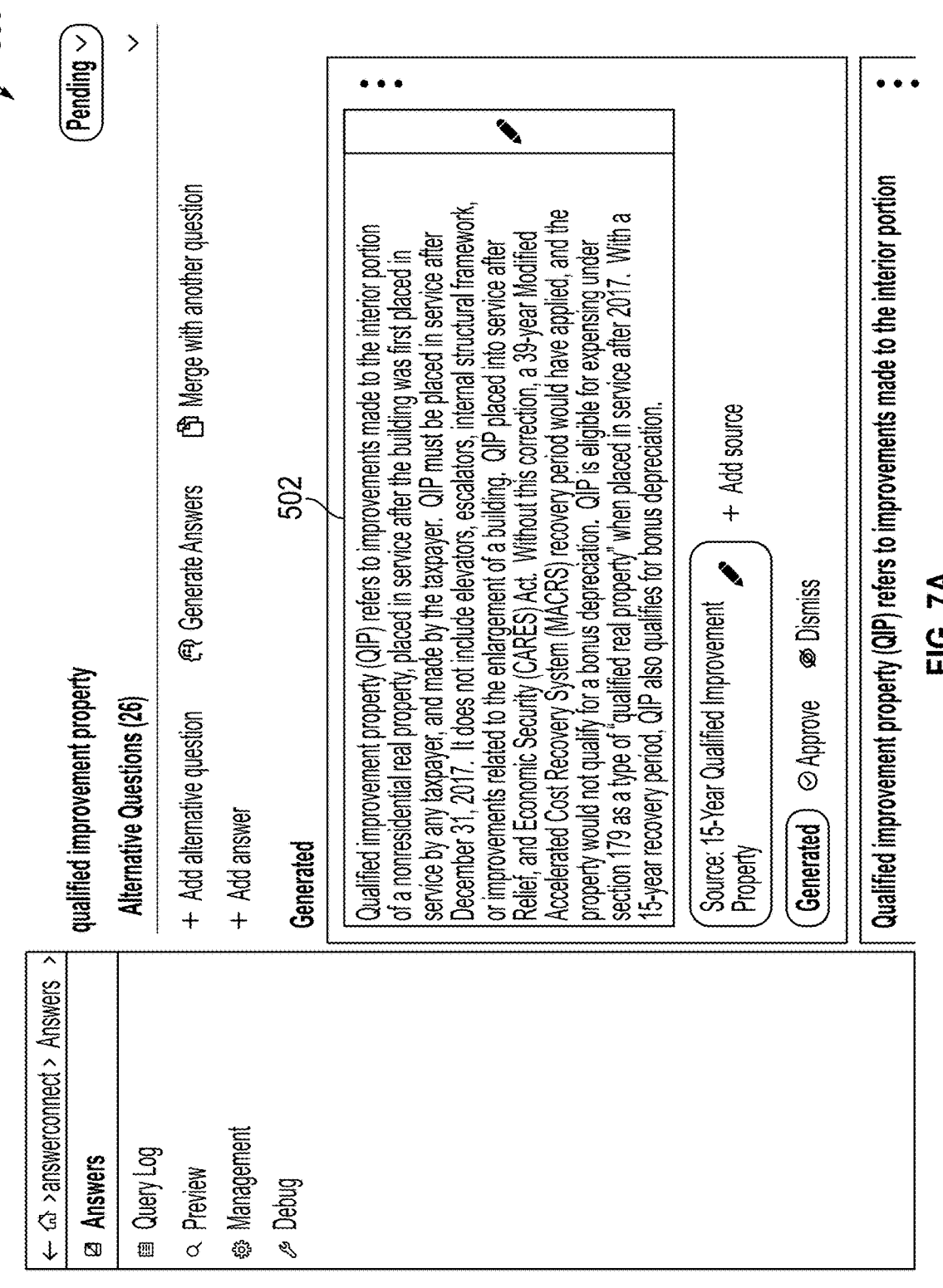
FIG. 7A illustrates a response modification interface, in accordance with some embodiments.
Figure 7B:
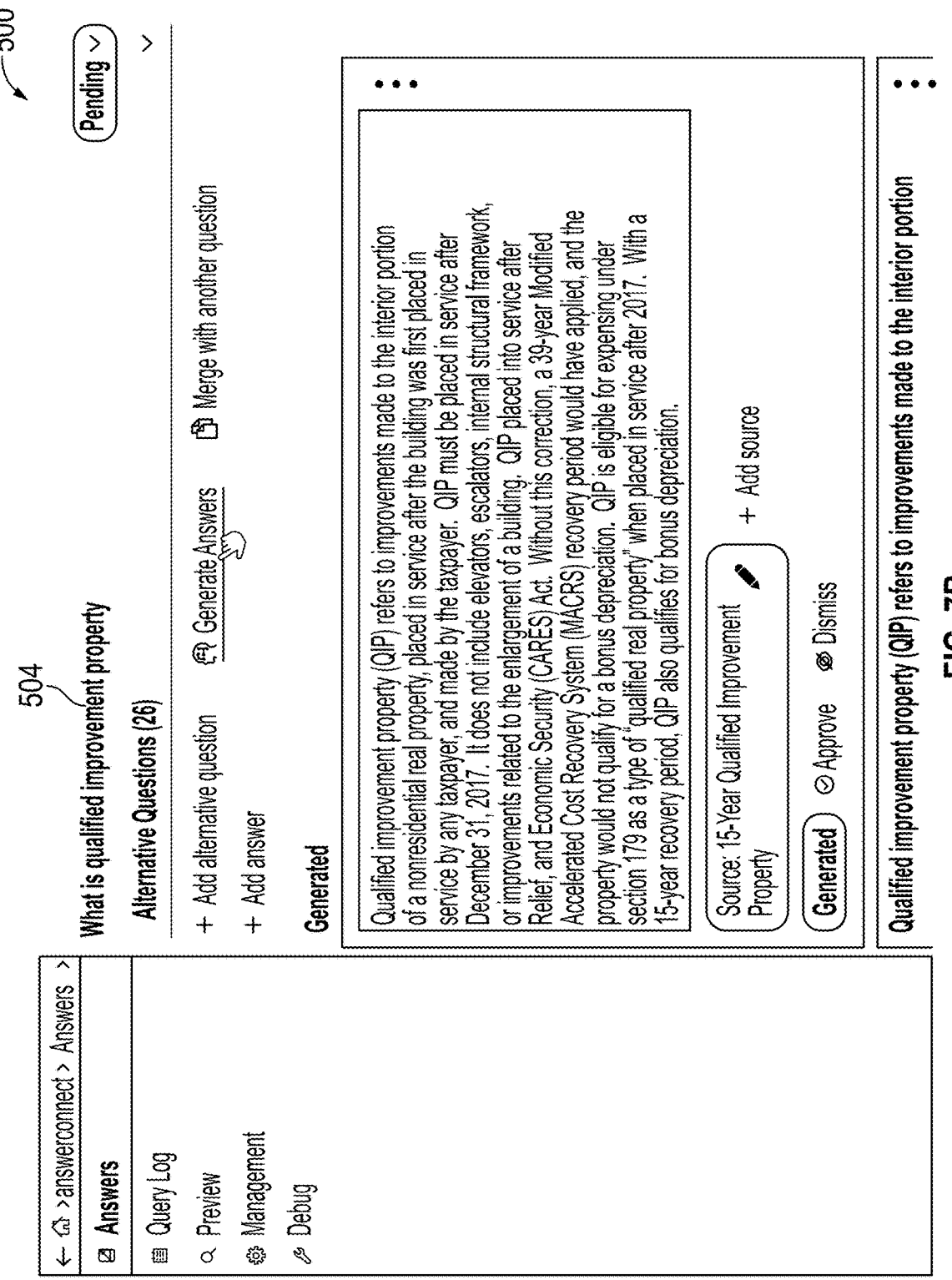
FIG. 7B illustrates another view of the response modification interface shown in FIG. 7A, in accordance with some embodiments.

FIG. 7A illustrates a response interface 500, in accordance with some embodiments. In response to selection of a query or a cluster (e.g., the cluster 406, FIG. 6), the system may generate queries and/or responses responsive to queries in that cluster. FIG. 7A illustrates an example response 502. FIG. 7B illustrates the responses interface 500 with an updated query 504 that may be autogenerated. When a query is selected, some embodiments generate query(s) based on the query. The query may be reviewed and/or the response presented. For example, a definition of a qualified improvement property may be reviewed. The query may be modified (e.g., to make a meaningful query). Then the query may be saved. The system may be prompted to generate responses. The system may respond with responses. To arrive at the results, the system may run a search, including identifying content that may contain information relevant to response the query. The system may then generate a number of responses. An appropriate response may be selected. A challenge may be that there are lots of content. For instance, some systems may have 60 million documents, some of which may be outdated, may not be maintained or only partially maintained. Some embodiments have an editorial review process. Some embodiments regenerate responses using the top ten (or a predetermined number of) documents. Queries and/or responses may be reviewed, approved, modified, and/or published.

Figure 8:
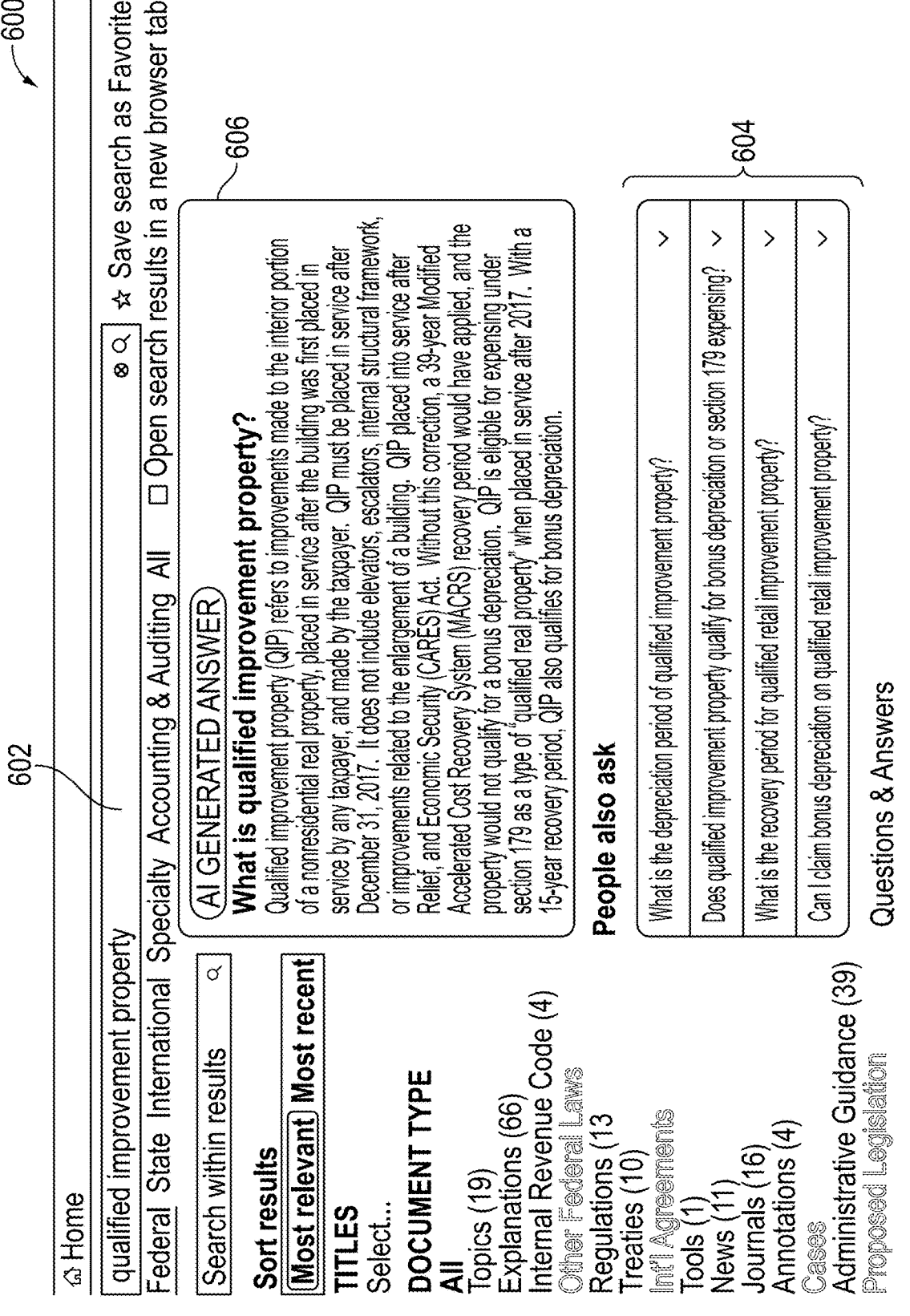
FIG. 8 illustrates a response interface including the modified response illustrated in FIG. 7A, in accordance with some embodiments.

FIG. 8 illustrates a query-response interface 600, in accordance with some embodiments. The interface 600 may be presented in response to a query entered in a search box 602. In some embodiments, in response to a query entered (e.g., a search for "qualified improvement property"), the system displays an AI-generated response 606. The system may also suggest additional queries 604 (e.g., "what is the depreciation period of qualified improvement property?") that are likely to be asked based on one or more keywords in the query. In some embodiments, FIG. 8 corresponds to an interface that uses AI-generated responses and/or queries, and/or published queries and/or responses.

Figure 9A:
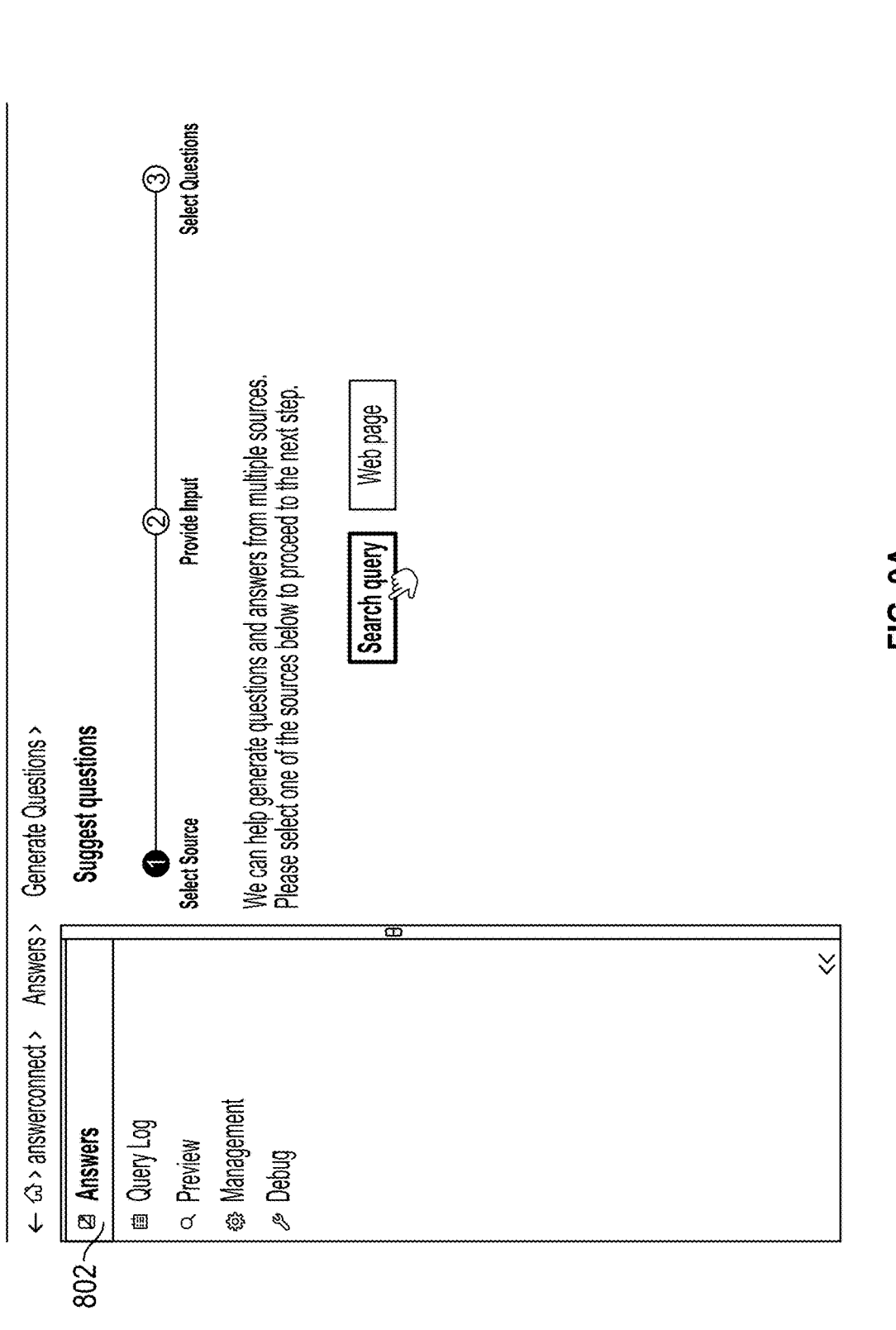
FIG. 9A illustrates a query suggestion interface, in accordance with some embodiments.
Figure 9B:
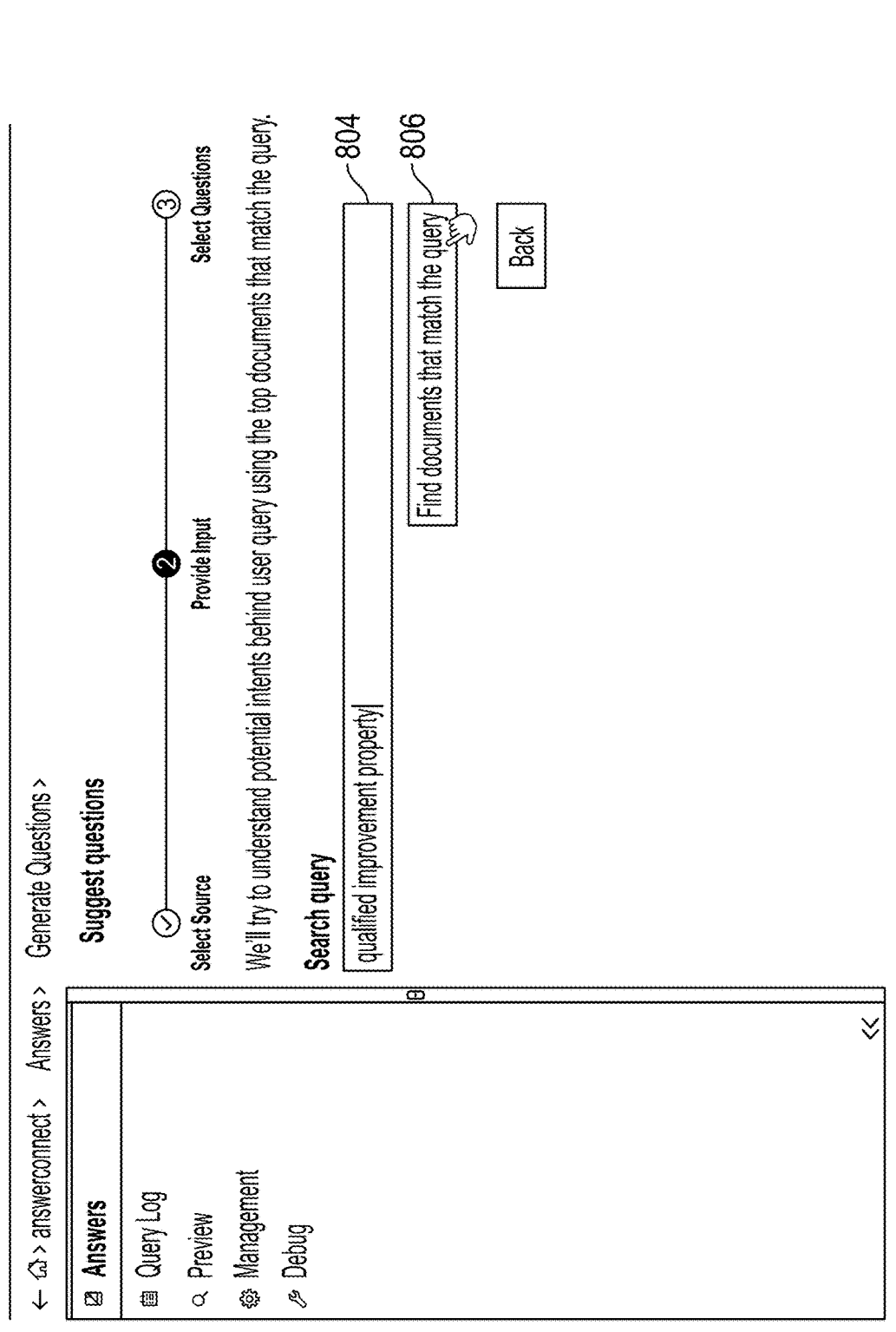
Figure 9C:
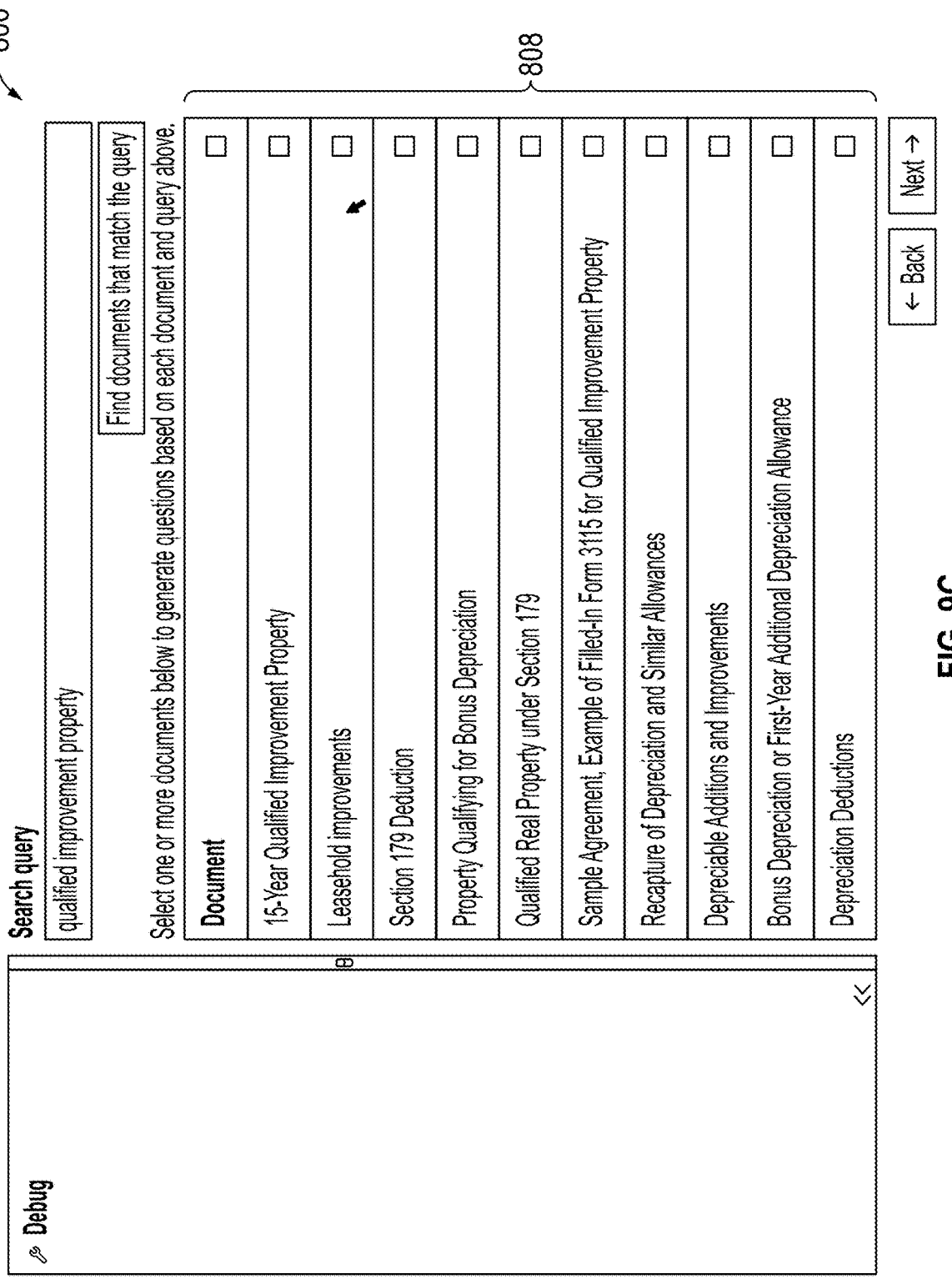
Figure 9D:
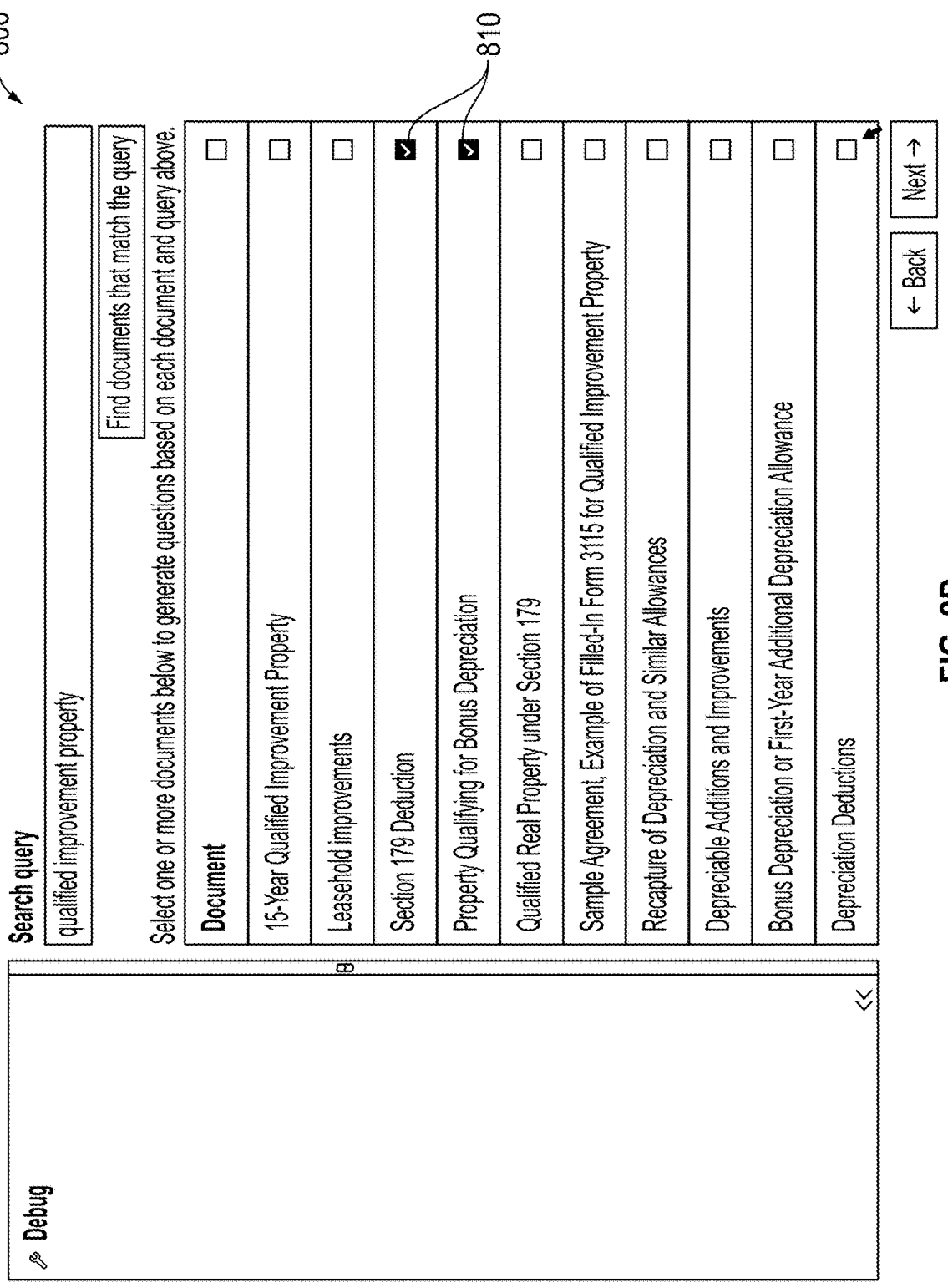
Figure 9E:
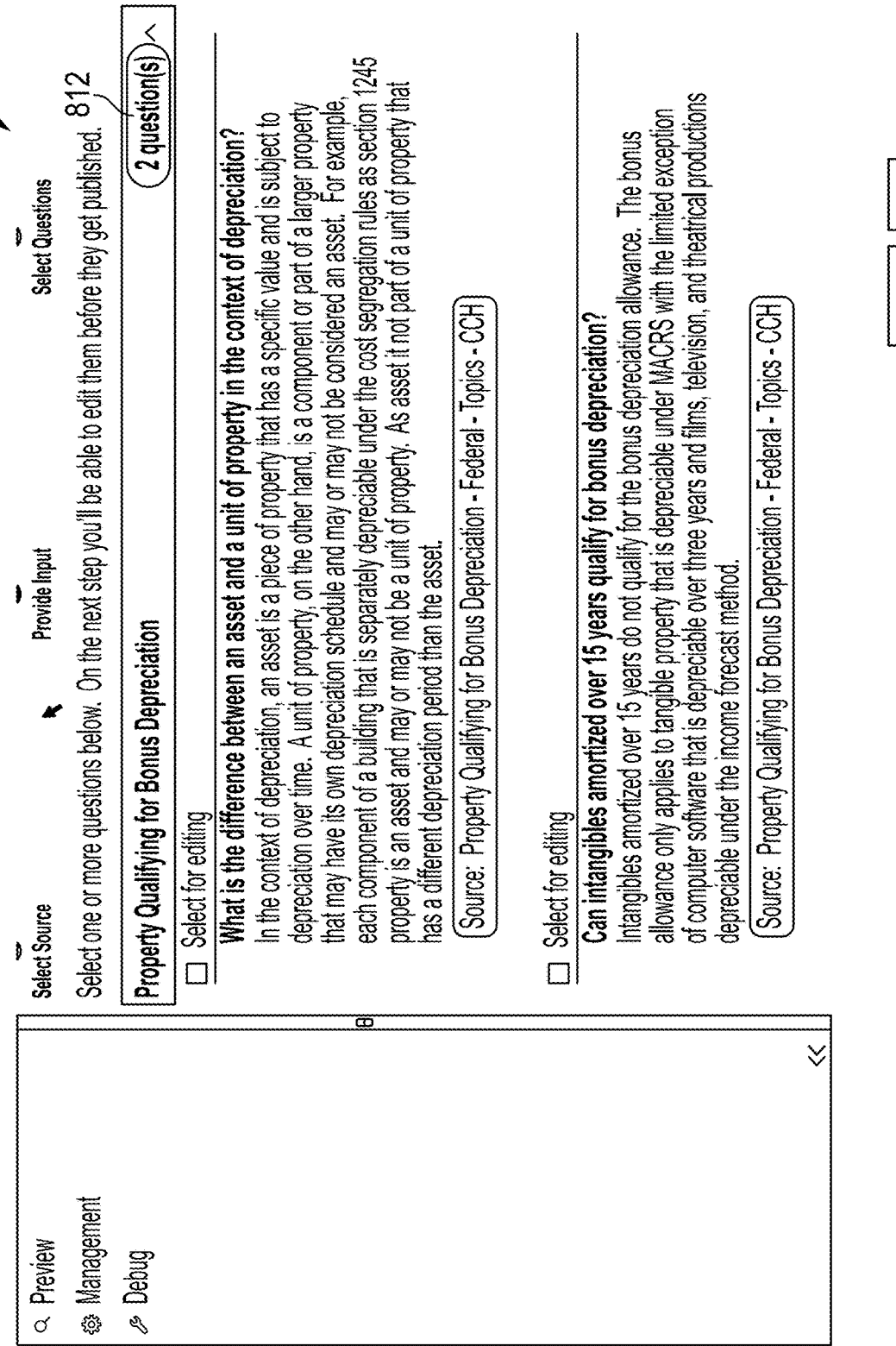
Figure 9F:
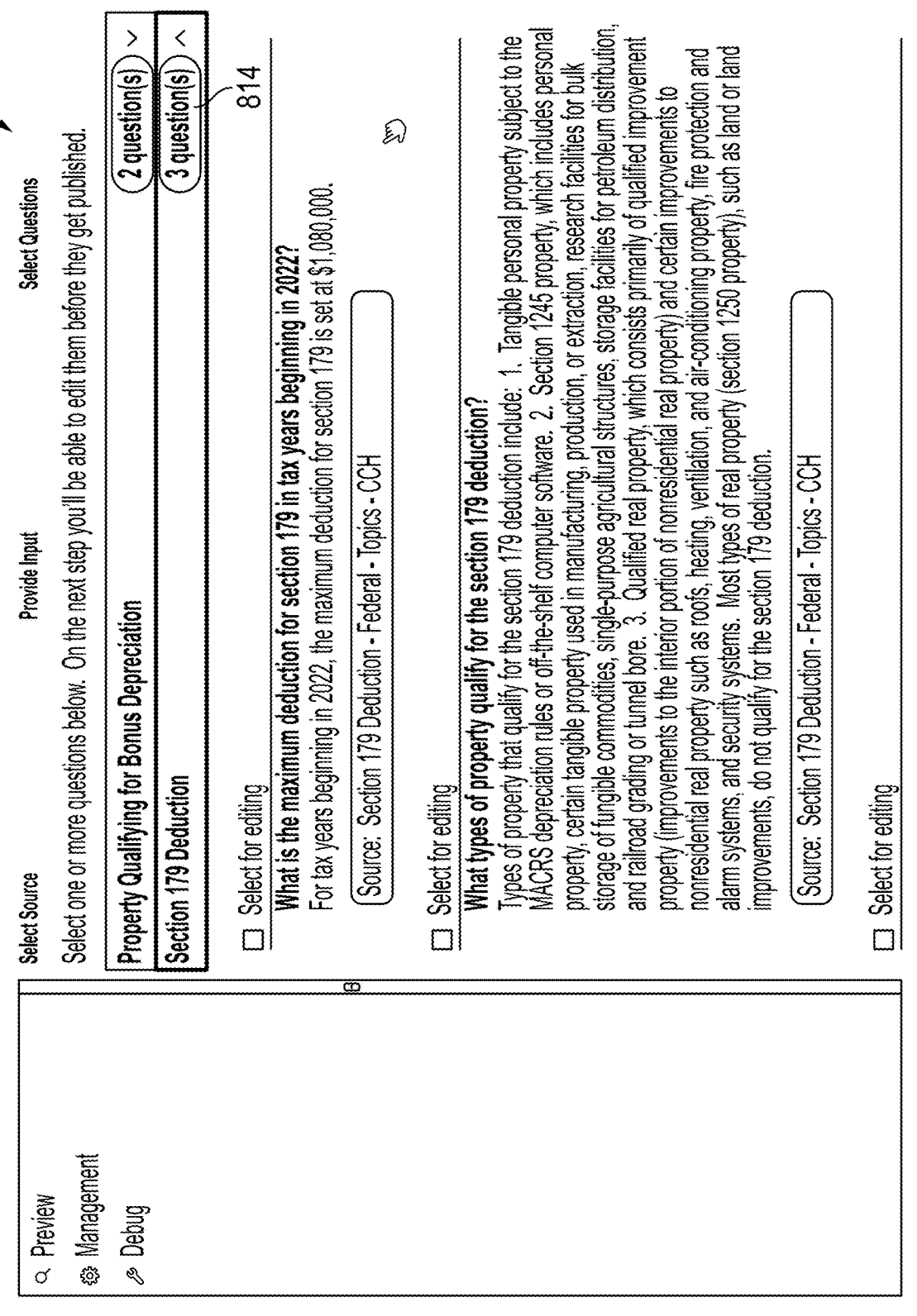
Figure 9G:
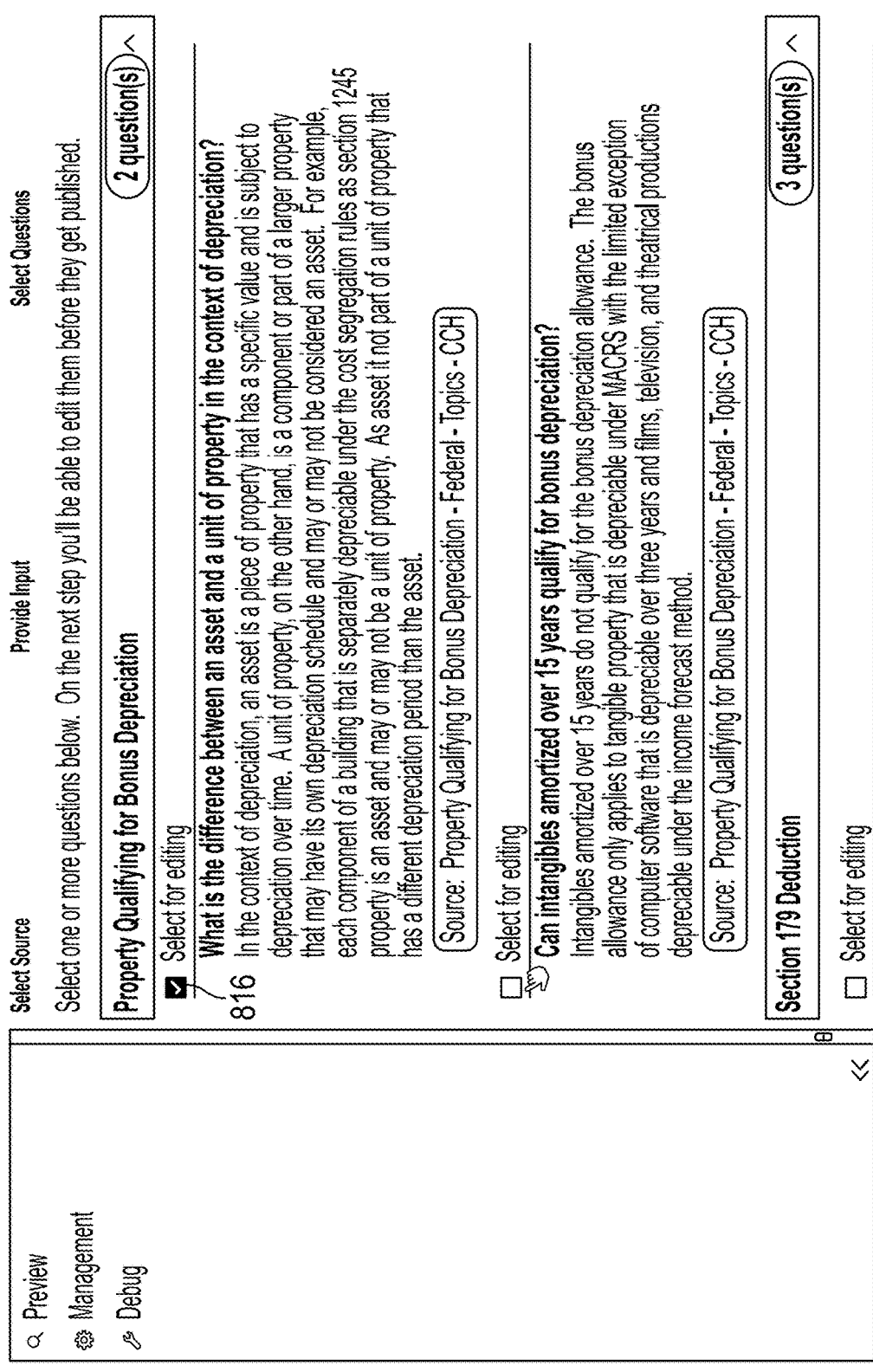

FIG. 9A illustrates a query suggestion interface 800, in accordance with some embodiments. This interface may be generated in response to selection of a response option 802 in a sidebar or pane. As shown, (1) a source may be selected, (2) additional input may be received, and/or (3) one or more queries may be selected (e.g., from the queries generated by the system, from historical query sets). The system may generate responses from multiple sources. FIG. 9B illustrates another view of the query suggestion interface 800, in accordance with some embodiments. A search query may be entered in a search box 804 and select an option 806 to find documents that match the query. FIG. 9C illustrates yet another view of the query suggestion interface 800, in accordance with some embodiments. The system may respond to the selection in FIG. 9B, by showing one or more documents 808 for selection. The system may return top ten documents. Some embodiments allow selection of one or more documents, such as, for example, documents that are optimal inputs to an LLM configured to suggest and/or generate queries. FIG. 9D illustrates a view of the query suggestion interface 800, in accordance with some embodiments. Two documents may be selected as shown in FIG. 9C, by selecting options 810. Some embodiments input each individual document and a query (e.g., "qualified improvement property") to a large language model. The large language model returns queries and responses that include that search query in the query. FIGS. 9E and 9F show views of the query suggestion interface 800, in accordance with some embodiments. The search may return a set of documents (e.g., in response to a query about property deduction). In the example shown in FIG. 9E, there are two results 812 from one document, and in the example shown in FIG. 9F, there are three results 816 from the other document. As shown in the view in FIG. 9G, one or more documents 816 may be selected. The results may be saved. The results may be stored into an in-progress list, an example of which is shown (in progress tab 818) in the example view in FIG. 9H. The results may be modified and/or published to production.

In some embodiments, a response is generated from each document (e.g., each document from the top ten search results), for example, using a large language model. Subsequently, generative AI may be used to help generated responses based on similarity between responses and/or to curated responses. A trained large language model (LLM) configured to generate responses, as provided herein, may be trained and/or limited to specific knowledge domains and/or documents such that queries and/or responses are generated only from trusted (e.g., known) content, increasing the probability that an LLM will generate a trusted response and/or that a response selected by a generative AI model will be the preferred response. This will also simplify editing and/or reviewing. For example, instead of scrolling through the top ten documents and analyzing them one by one, a system may present meaningful, pre-generated preferred responses.

Figure 10:
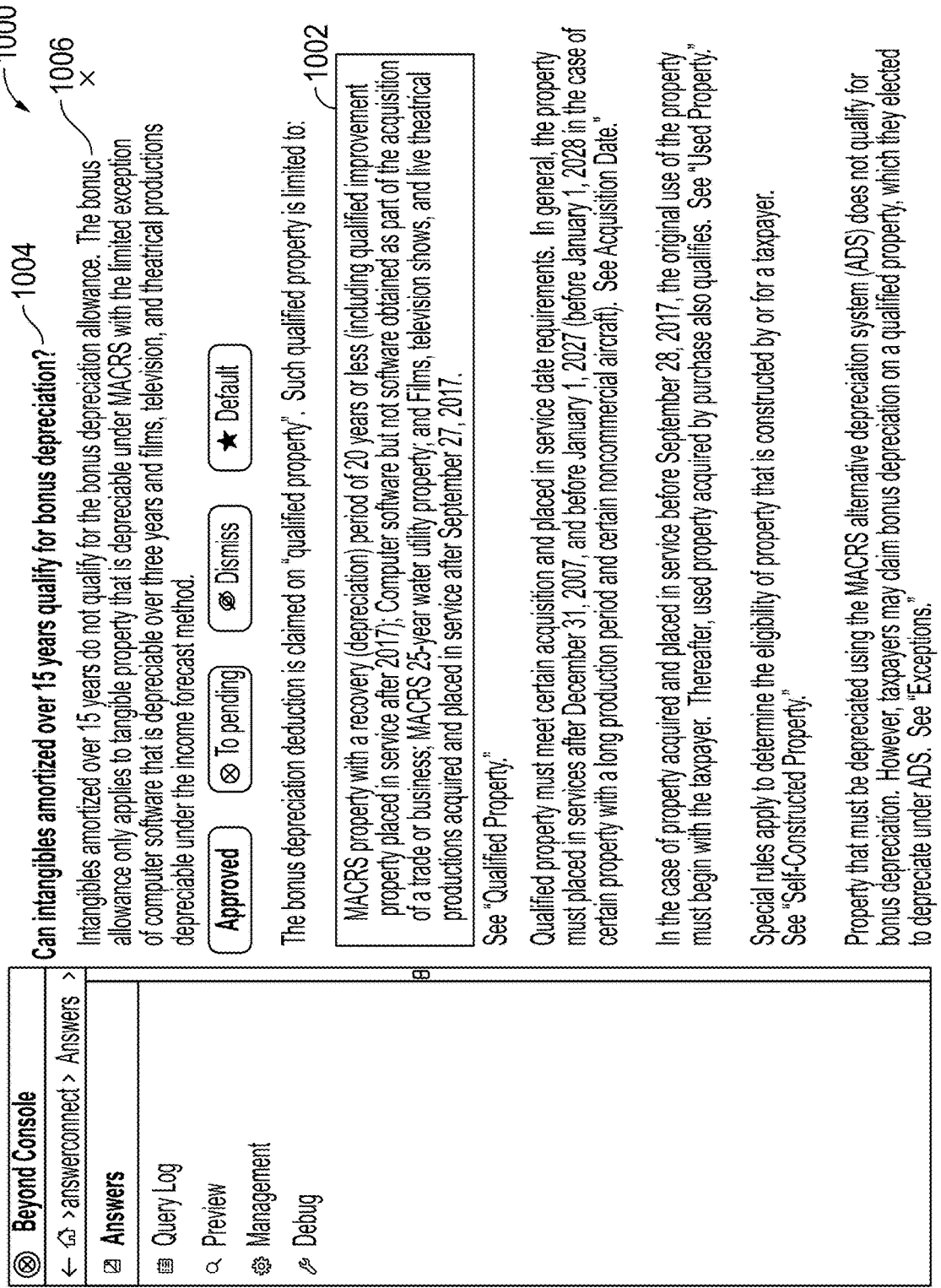
FIG. 10 illustrates a response generation interface, in accordance with some embodiments.

In some embodiments, highlighting is provided to assist and/or accelerate a review process of AI-generated responses. During validation, links and/or interface elements may be provided to provide and/or display a source within a document that was used to generate a response. FIG. 10 illustrates a search interface 1000, in accordance with some embodiments. In response to a query 1004, the system may show excerpts and/or highlighted portions 1002 from a document that was used to generate a response 1006. Some embodiments provide visual cues to editors to review and/or approve responses. There may not be a recent notion of a content unless the content was recently edited. Some queries can be complicated so some embodiments help by showing relationality and/or by automatically opening the original document that was used (to generate a query and/or response). In some embodiments, when a document is selected, the text that was used for the generation may be highlighted. Such features can help speed up the review process. In conventional systems, a document may be opened in a separate tab. It could take a while to actually find the document. Some documents are lengthy, so the discovery, review, and/or validation process can be time-consuming, so the highlighting feature can be useful.

With reference again to FIG. 3, at step 110, a set of curated queries and corresponding responses is stored for use in a knowledge-based search system. In some embodiments, when a user query is received, the user query is semantically matched to at least one of the curated queries and the curated query and/or associated response are provided to the user via an interface.

Figure 11:
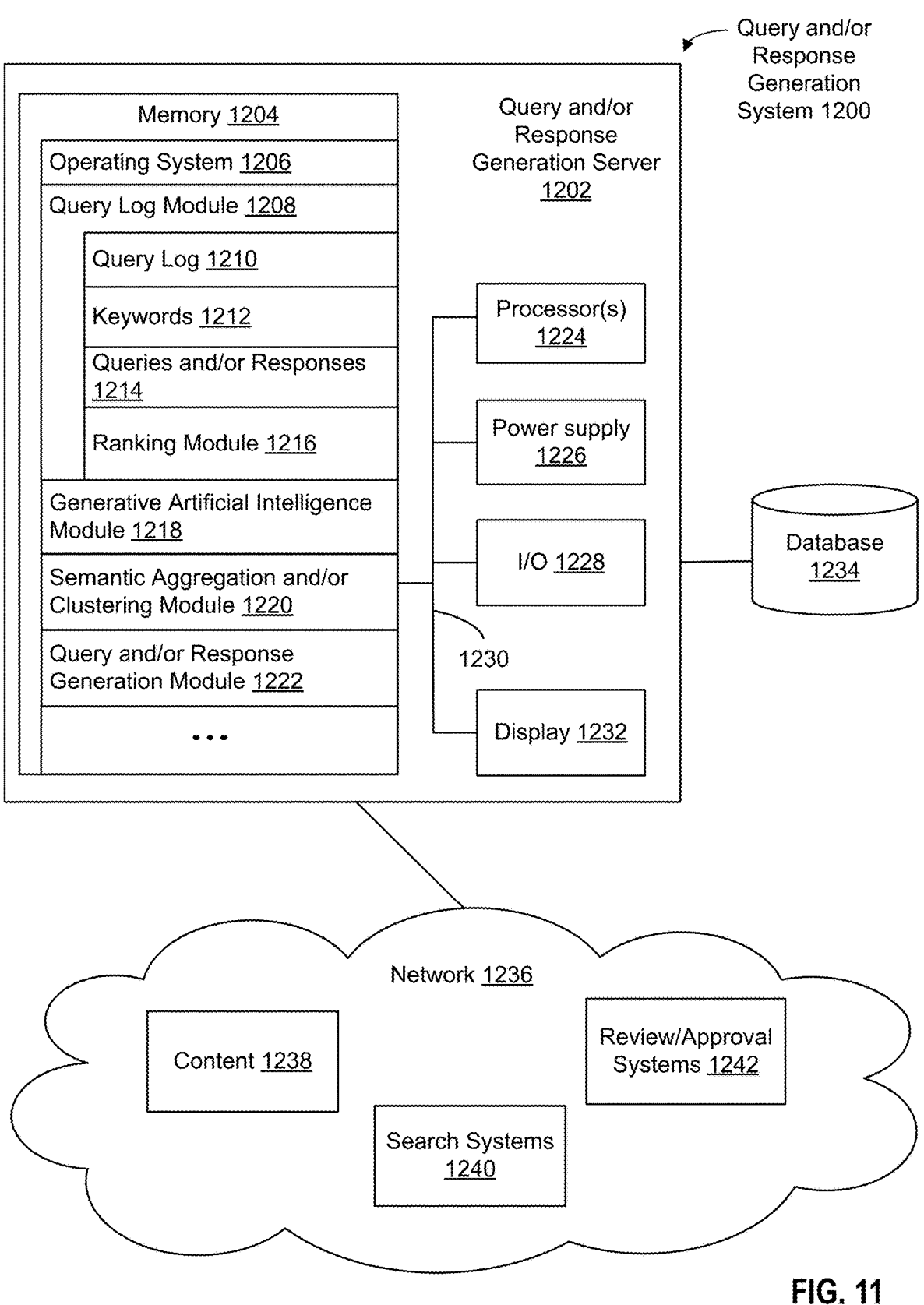
FIG. 11 is a system diagram of an example query and/or response generation system, in accordance with some embodiments.

FIG. 11 is a system diagram of an example query and/or response generation system 1200, according to some embodiments. The system 1200 typically includes a query and/or response generation server 1202 that includes one or more processor(s) 1224, a memory 1204, a power supply 1226, an input/output (I/O) subsystem 1228, and a communication bus 1230 for interconnecting these components. Processor(s) 1224 execute modules, programs and/or instructions stored in the memory 1204 and thereby perform processing operations, including the methods described herein according to some embodiments. In some embodiments, the server 1202 also includes a display 1232 for displaying visualizations (e.g., visualizations or interfaces described above in reference to FIGS. 1-11B). In some embodiments, the server 1202 generates displays or visualizations, and transmits the visualization (e.g., as a visual specification) to a client device (e.g., search systems 1240, review/approval systems 1242) for display. Some embodiments of the server 1202 include touch, selection, or other I/O mechanisms coupled to the server 1202 via the I/O subsystem 1228, to process input from users that select (or deselect) visual elements of a displayed visualization. In some embodiments, the client device (or software therein) processes user input and transmits a signal to the server 1202 for processing. Some aspects of the server 1202 (e.g., the modules in the memory 1204) are implemented in one or more client devices, in accordance with some embodiments.

In some embodiments, the memory 1204 stores one or more programs (e.g., sets of instructions), and/or data structures, collectively referred to as "modules" herein. In some embodiments, the memory 1204, or the non-transitory computer readable storage medium of the memory 1204, stores the following programs, modules, and data structures, or a subset or superset thereof:

- an operating system 1206;
- a query log module 1208 to obtain and/or process query logs 1210, keywords 1212, queries and/or responses 1214, and/or a ranking module 1216 (e.g., a module to rank queries and/or responses based on popularity, frequency, any other user and/or data-driven parameters);
- a generative artificial intelligence module 1218 that may include machine language models, such as large language models, data to train and/or test the models, model parameters, hyperparameters, and/or weights;
- a semantic aggregation and/or clustering module 1220, an example of which is described below in reference to FIG. 15, according to some embodiments. In some embodiments, clustering is a part of segmentation analysis of similar, disparate queries that may not be semantically adjacent or close but rather are descriptively similar. In some embodiments, cluster identification is trained on documents, queries and/or responses; and a query and/or response generation module 1222 for generating queries and/or responses based on data and/or output of the query log module 1208, generative artificial intelligence module 1218, semantic aggregation and/or clustering module 1220.

Further details of these modules are described below in reference to FIGS. 13, 14, and FIG. 14, in accordance with some embodiments.

The above identified modules (e.g., data structures, and/or programs including sets of instructions) need not be implemented as separate software programs, procedures, or modules, and thus various subsets of these modules may be combined or otherwise re-arranged in various embodiments. In some embodiments, the memory 1204 stores a subset of the modules identified above. In some embodiments, a database 1234 (e.g., a local database and/or a remote database) stores one or more modules identified above and data associated with the modules. Furthermore, the memory 1204 may store additional modules not described above. In some embodiments, the modules stored in memory 1204, or a non-transitory computer readable storage medium of memory 1204, provide instructions for implementing respective operations in the methods described below. In some embodiments, some or all of these modules may be implemented with specialized hardware circuits that subsume part or all of the module functionality. One or more of the above identified elements may be executed by the one or more of processor(s) 1224.

The I/O subsystem 1228 communicatively couples the server 1202 to one or more devices, such as the content 1238, the search systems 1240, and/or the review/approval systems 1242, via a local and/or wide area communications network 1236 (e.g., the Internet) via a wired and/or wireless connection. The content 1238 may store content for a predetermined knowledge domain. The search systems 1240 may be stand-alone devices (servers or client devices) used to search for content, queries and/or responses. Alternatively, the search system 1240 may be implemented as part of the server 1202. Similarly, the review/approval systems 1242, which may be used to review and/or approve queries and/or responses, may be stand-alone devices or integrated into the server 1202. In some embodiments, the server 1201 pulls data from the content 1238, the search systems 1240 and/or the review approval systems 1242. In other embodiments, the content 1238, the search systems 1240 and/or the review approval systems 1242 push data to the server 1202.

Communication bus 1230 optionally includes circuitry (sometimes called a chipset) that interconnects and controls communications between system components.

FIG. 12 is a flowchart for an example method 1300 for automatic query and response generation. The method may be performed by various modules of the server 1200 described above. The method may include obtaining (1302) (e.g., by the query log module 1208) a query log of historical queries within a predetermined knowledge domain. The method may also include clustering (1304) (e.g., by the semantic aggregation and/or clustering module 1220) the query log to identify one or more sets of queries using semantic aggregation. The method may also include generating (1306) one or more responses for each of the one or more sets of queries using a large language model (e.g., using a language model in the generative artificial intelligence module 1218). The responses may be within the predetermined knowledge domain. The method may also include receiving (1308) (e.g., by the query and/or response generation module 12220) feedback data for each of the one or more responses. The feedback data may identify a preferred response. The method may also include in response to receiving a new query, providing (1310) (e.g., by the query and/or response generation module 1222) a new response to the new query. The new response may be a preferred response for a set of queries including the new query.

In some embodiments, the method further includes, prior to receiving feedback data, prioritizing (e.g., by the ranking module 1216) the one or more responses, based on frequency of queries in the query log. In some embodiments, the method further includes, prior to generating one or more responses, prioritizing (e.g., by the ranking module 1216) the one or more sets of queries, based on frequency of queries in the query log.

In some embodiments, the method further includes associating one or more queries with the one or more responses (e.g., by the query and/or response generation module 1222) based on the feedback data.

In some embodiments, the method further includes receiving queries based on keywords (e.g., the keywords 1212) obtained from the one or more sets of queries, and/or generating (e.g., by the module 1222) the one or more responses based on the received queries.

In some embodiments, the method further includes highlighting (e.g., by the query and/or response generation module 1222) sources used for generating queries for receiving feedback data for each of the one or more responses.

In some embodiments, the method further includes after a first query is selected, preloading (e.g., by the query and/or response generation module 1222) one or more queries related to the first query. The first query may be based on the feedback data. The one or more queries may be generated using a large language model and/or semantic aggregation.

FIG. 13 illustrates a flowchart of another example method 1400 for automatic query and response generation, in accordance with some embodiments. The method may be performed by various modules of the server 1200. The method may include obtaining (1402) a first query, identifying (1402) a plurality of documents that is relevant to the first query, and/or presenting (1406) the plurality of documents. The method may also include, in response to (1408) receiving a selection of one or more documents from the plurality of documents: for each document of the one or more documents: generating (1410) a set of textual content elements, and receiving feedback data indicating a selection of one or more of the set of textual content elements. The method may also include associating (1412) the selected one or more of the set of textual content elements with a set of queries including the first query, and/or in response to receiving a second query in the set of queries, selecting and displaying (1414) the preferred response associated with the set of queries.

Figure 14:
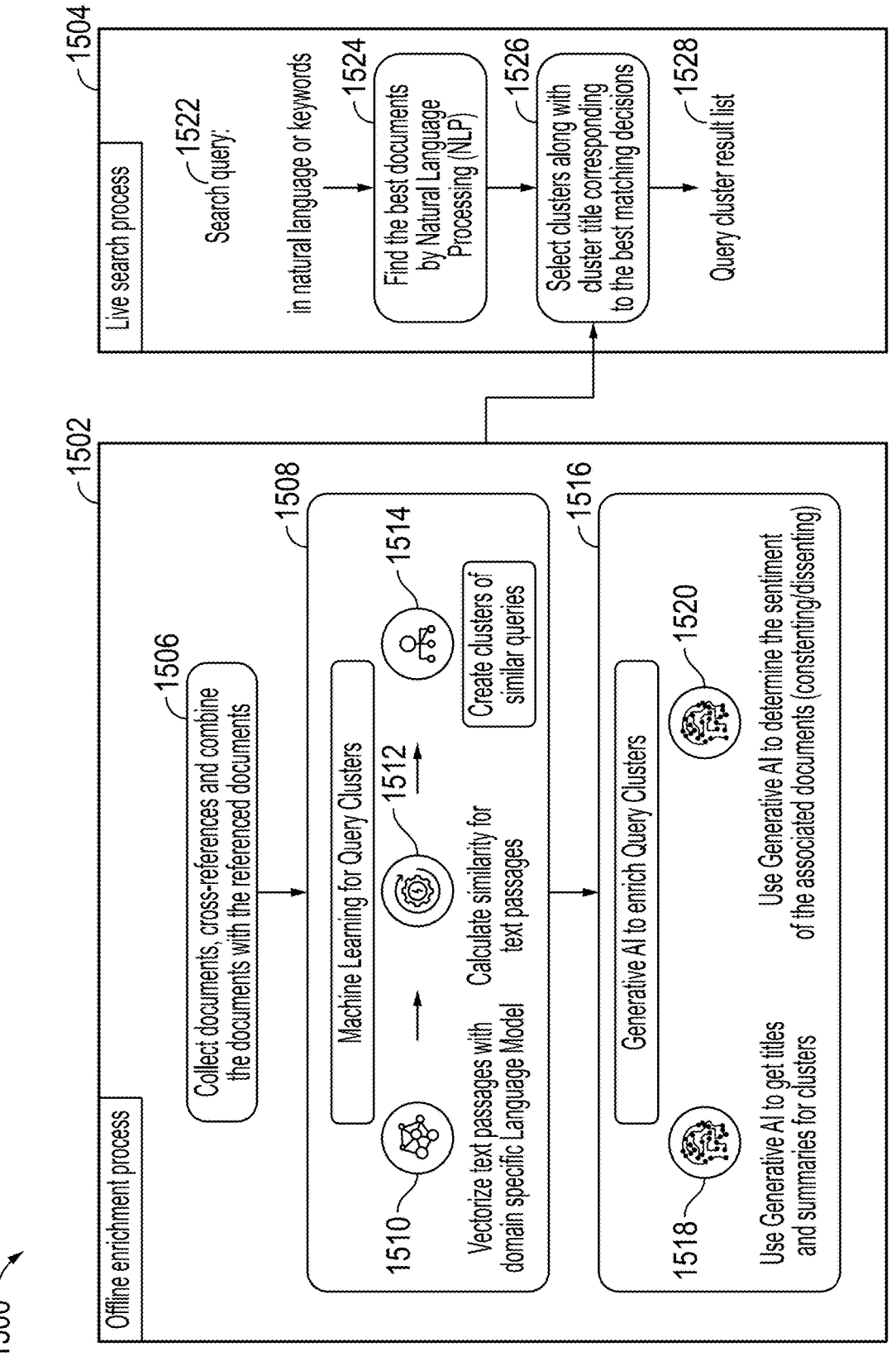
FIG. 14 is a schematic diagram of an example process for clustering and/or semantic aggregation, in accordance with some embodiments.

FIG. 14 is a schematic diagram of an example process 1500 for clustering and/or semantic aggregation, in accordance with some embodiments. The process may include an offline enrichment process 1502 and/or a live search process 1504. The offline enrichment process 1502 may include collecting and/or combining (1506) documents and/or (content from) cross-references. The process may also include machine learning for obtaining (1508) query clusters, which may include vectorizing (1510) text passages with domain specific language model, calculating (1512) similarity for text passages, and/or creating (1514) clusters of similar queries. The process 1502 may also include using generative AI (1516) to enrich the query clusters. This step may in turn include using generative AI (1518) to obtain titles and/or summaries for clusters, and/or using generative AI (1520) to determine sentiment of associated documents (e.g., consenting or dissenting opinions). The live search process 1504 may include inputting (1522) search queries in natural language or keywords to identify (1524) documents by natural language processing (NLP), selecting (1526) clusters (e.g., using the process 1502) along with cluster title corresponding to a matching decision (1526), to obtain query cluster result list (1528).

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widgets, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen to best explain the principles underlying the claims and their practical applications, to thereby enable others skilled in the art to best use the implementations with various modifications as are suited to the particular uses contemplated.

What is claimed is:

1. A method, implemented by one or more processors, for efficient and adaptable query and response generation, the method comprising:

obtaining a first query;

identifying, by the one or more processors, a plurality of documents relevant to the first query;

generating, using a machine learning model, one or more additional queries that are semantically similar to the first query, wherein generating the additional queries includes vectorizing text passages using a large language model, calculating semantic similarity for the vectorized text passages, and using an artificial intelligence generative model to obtain a summary for the one or more additional queries, and wherein the plurality of documents includes a first set of documents selected in response to the first query and a second set of documents selected in response to the one or more additional queries;

presenting, via a user device, a user interface listing identifiers of the plurality of documents;

in response to receiving a user selection of one or more documents from the plurality of documents:

for each selected document:

generating by the one or more processors, a plurality of responses based on the document, using the generative model;

generating, using the generative model, at least one link to a source portion of the document used by the generative model to generate at least a portion of the plurality of responses; and receiving feedback data from the user device indicating a user selection of one or more of the plurality of responses, wherein the feedback is based at least in part on the one or more of the plurality of responses;

associating the at least one response with a set of queries, including the first query, in a memory; and in response to receiving a second query in the set of queries, selecting a preferred response associated with the set of queries, based on the feedback, and displaying the preferred response via the user interface.

2. The method of claim 1, further comprising, prior to receiving the selection of the one or more documents, prioritizing at least one document of the plurality of documents based on a relevance of the at least one document to the first query.

3. The method of claim 1, wherein the generative model is a large language model.

4. The method of claim 1, further comprising highlighting source portions of the documents used by the generative model to generate the at least one response.

5. A system, comprising:

one or more processors; and a non-transitory memory storing instructions that, when executed, cause the processor to obtaining a first query;

identify, by the one or more processors, a plurality of documents relevant to the first query;

generate, using a machine learning model, one or more additional queries that are semantically similar to the first query, wherein generating the additional queries includes vectorizing text passages using a large language model, calculating semantic similarity for the vectorized text passages, and using an artificial intelligence generative model to obtain a summary for the one or more additional queries, and wherein the plurality of documents includes a first set of documents selected in response to the first query and a second set of documents selected in response to the one or more additional queries;

present, via a user device, a user interface listing identifiers of the plurality of documents;

in response to receiving a user selection of one or more documents from the plurality of documents:

for each selected document:

generate by the one or more processors, a plurality of responses based on the document, using the generative model;

generate, using the generative model, at least one link to a source portion of the document used by the generative model to generate at least a portion of the plurality of responses; and receive feedback data from the user device indicating a user selection of one or more of the plurality of responses, wherein the feedback is based at least in part on the one or more of the plurality of responses;

associate the at least one response with a set of queries, including the first query, in a memory; and in response to receiving a second query in the set of queries, select a preferred response associated with the set of queries, based on the feedback, and display the preferred response via the user interface.

6. The system of claim 5, wherein the instructions cause the processor to, prior to receiving the selection of the one or more documents, prioritize at least one document of the plurality of documents based on a relevance of the at least one document to the first query.

7. The system of claim 5, wherein the generative model is a large language model.

8. The system of claim 5, wherein the instructions cause the processor to, highlight source portions of the document s used by the generative model to generate the at least one response.

9. A non-transitory computer-readable medium having instructions stored thereon, wherein the instructions, when executed by at least one processor, cause at least one device to perform operations comprising:

obtaining a first query;

identifying, by the one or more processors, a plurality of documents relevant to the first query;

generating, using a machine learning model, one or more additional queries that are semantically similar to the first query, wherein generating the additional queries includes vectorizing text passages using a large language model, calculating semantic similarity for the vectorized text passages, and using an artificial intelligence generative model to obtain a summary for the one or more additional queries, and wherein the plurality of documents includes a first set of documents selected in response to the first query and a second set of documents selected in response to the one or more additional queries;

presenting, via a user device, a user interface listing identifiers of the plurality of documents;

in response to receiving a user selection of one or more documents from the plurality of documents:

for each selected document:

generating by the one or more processors, a plurality of responses based on the document, using the generative model;

generating, using the generative model, at least one link to a source portion of the document used by the generative model to generate at least a portion of the plurality of responses; and receiving feedback data from the user device indicating a user selection of one or more of the plurality of responses, wherein the feedback is based at least in part on the one or more of the plurality of responses;

associating the at least one response with a set of queries, including the first query, in a memory; and in response to receiving a second query in the set of queries, selecting a preferred response associated with the set of queries, based on the feedback, and displaying the preferred response via the user interface.

10. The non-transitory computer-readable medium of claim 9, wherein the instructions cause the device to perform operations comprising, prior to receiving the selection of the one or more documents, prioritizing at least one document of the plurality of documents based on a relevance of the at least one document to the first query.

11. The non-transitory computer-readable medium of claim 9, wherein the instructions cause the device to perform operations comprising highlighting source portions of the document s used by the generative model to generate the at least one response.

* * * * *